United States Patent [19]

Masuko et al.

[11] Patent Number: 4,686,564
[45] Date of Patent: Aug. 11, 1987

[54] COMMUNICATION DATA PROCESSING DEVICE OF CABLE TELEVISION SYSTEM

[75] Inventors: Akinori Masuko; Wataru Kuroiwa, both of Fukaya; Shouji Uehara, Yokohama; Tsutomu Uekusa, Funabashi, all of Japan; Robert M. Rast, Englewood; W. Sherwood Campbell, Littleton, both of Colo.

[73] Assignees: Kabushiki Kaisha Toshiba, Kawasaki, Japan; American Television & Communications Corp., Englewood, Colo.

[21] Appl. No.: 739,107

[22] Filed: May 30, 1985

[30] Foreign Application Priority Data

May 30, 1984 [JP] Japan .................. 59-108625

[51] Int. Cl.⁴ .................. H04N 7/10; H04N 7/173
[52] U.S. Cl. .................. 358/86; 358/84; 358/349; 455/4
[58] Field of Search .................. 358/84, 86, 114, 115; 455/2, 4, 5

[56] References Cited

U.S. PATENT DOCUMENTS

| | | | |
|---|---|---|---|
| 3,993,955 | 11/1976 | Belcher et al. | 358/86 |
| 4,015,074 | 3/1977 | Inoue et al. | 358/86 |
| 4,081,753 | 3/1978 | Miller | 358/84 X |
| 4,475,123 | 10/1984 | Dumbauld et al. | 358/86 X |
| 4,484,217 | 11/1984 | Block et al. | 358/84 |
| 4,484,218 | 11/1984 | Boland et al. | 358/86 |
| 4,510,623 | 4/1985 | Bonneau et al. | 358/114 X |
| 4,530,008 | 7/1985 | McVoy | 358/86 X |
| 4,536,791 | 8/1985 | Campbell et al. | 358/86 |
| 4,566,030 | 1/1986 | Nickerson et al. | 358/84 |

FOREIGN PATENT DOCUMENTS 128555 12/1984 European Pat. Off. ............ 358/84

*Primary Examiner*—Keith E. George
*Attorney, Agent, or Firm*—Finnegan, Henderson Farabow, Garrett and Dunner

[57] ABSTRACT

An external control unit for a CATV system has a CPU and a RAM with many kinds of memory maps. Reference data to be stored in the memory maps is transmitted from a central station. When a subscriber requests the tuning of a TV channel for a pay program to a converter tuner, the CPU in the external control unit can work, using the reference data.

14 Claims, 17 Drawing Figures

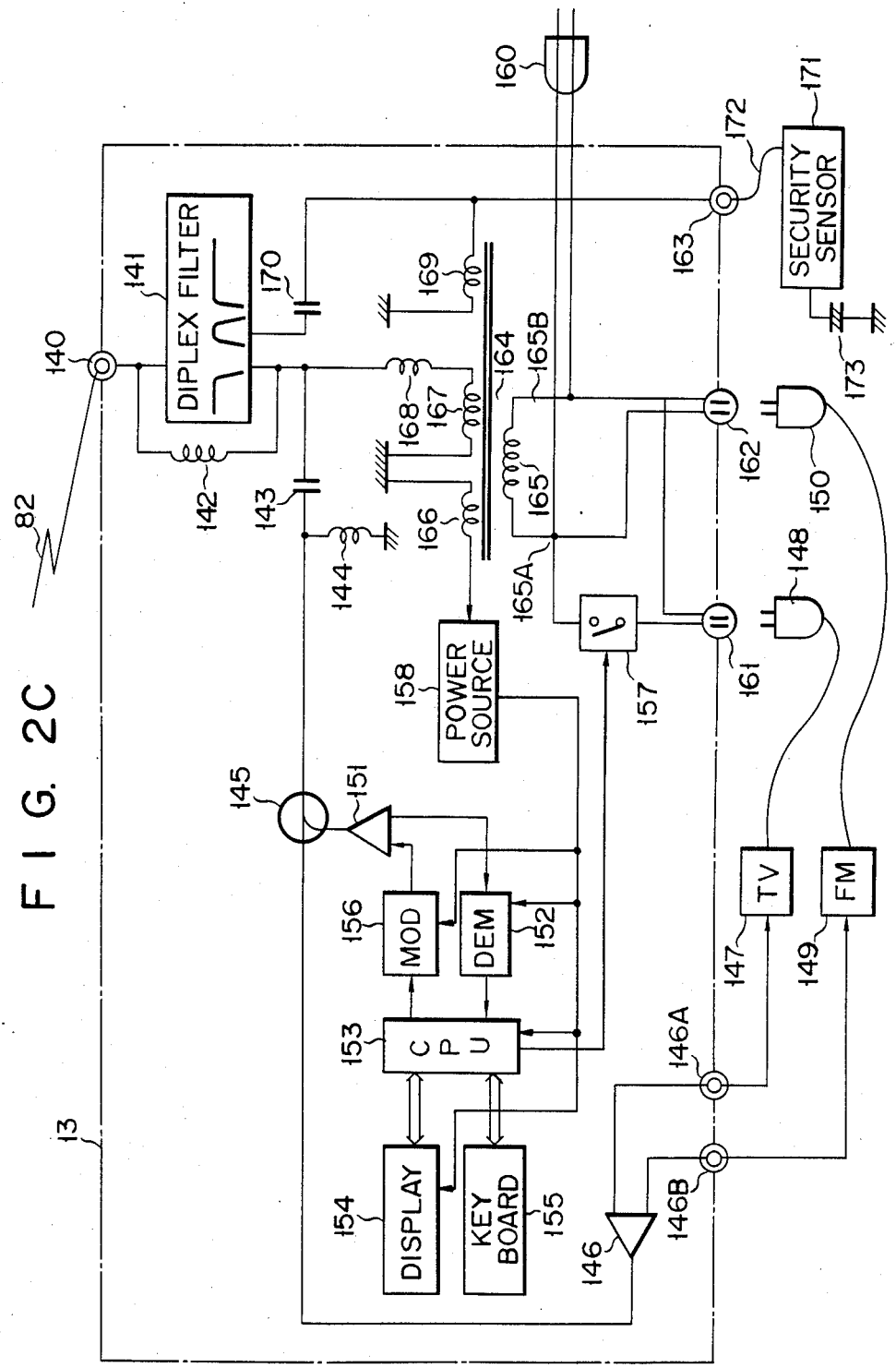

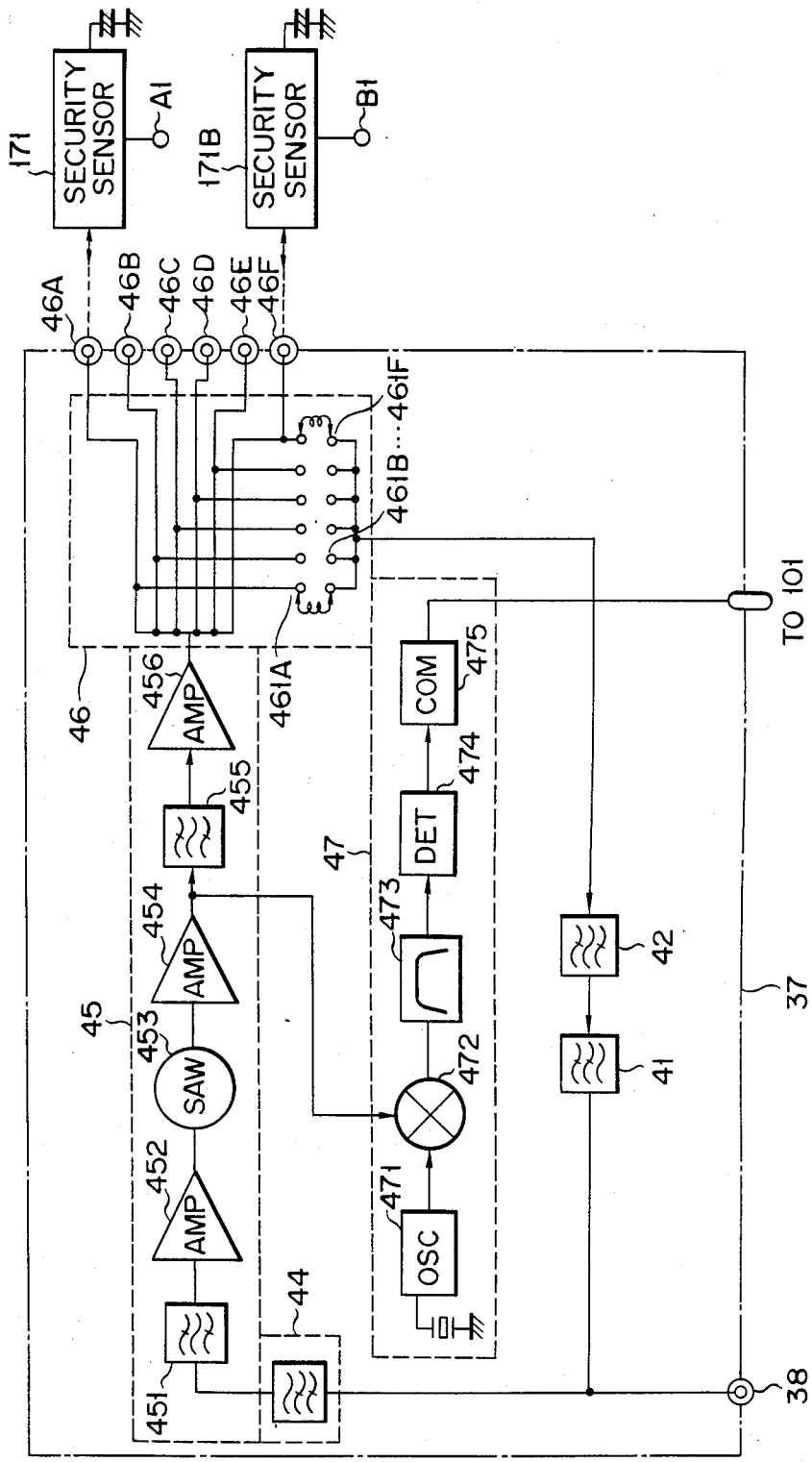
F I G. 5

FIG. 13

|  | PN1 | PN2 | PN3 | PN4 | | PN127 | PN128 | |
|---|---|---|---|---|---|---|---|---|
| CHD | O | O | O | O | | O | O | |
| | O | O | O | O | | O | O | |
| | : | : | : | : | | : | : | 612 |
| | O | O | O | O | | O | 1 | |
| | O | 1 | O | O | | O | 1 | |
| FLD | O | 1 | O | O | | O | 1 | |

|  | PN1 | PN2 | PN3 | PN4 | | PN127 | PN128 | |
|---|---|---|---|---|---|---|---|---|
| SUB1 | O | 1 | O | O | | O | O | |
| SUB2 | O | 1 | O | O | | O | O | 712 |
| SUB3 | 1 | O | O | O | | O | O | |
| SUB4 | O | O | O | O | | O | O | |
| SUB5 | O | O | O | O | | O | O | |
| SUB6 | O | O | O | O | | O | O | |

|  | PN1 | PN2 | PN3 | PN4 | | PN127 | PN128 | |
|---|---|---|---|---|---|---|---|---|
| SUB1 | O | 1 | O | O | | O | O | |
| SUB2 | O | O | O | O | | O | O | 171 |
| SUB3 | O | O | O | O | | O | O | |
| SUB4 | O | O | O | O | | O | O | |
| SUB5 | O | O | O | O | | O | O | |
| SUB6 | O | O | O | O | | O | O | |

COMMUNICATION DATA PROCESSING DEVICE OF CABLE TELEVISION SYSTEM

BACKGROUND OF THE INVENTION

The present invention relates to a communication data processing device of a cable television system and, more particularly, to improvements in a data communication processing function between a central station, an external control unit (ECU) and a subscriber processing unit (SPU) by, for example, using the SPU as an I/O port.

In a cable television system (to be referred to as a CATV system hereinafter), television broadcast signals for 64 channels can be transmitted from a central station through a cable. In the CATV system, a function for bidirectional data communication between the subscriber and the central station is added. The communication content includes program data, program reservation data, charge data, service data and the like. However, it is very difficult to process the above communication data by a single central station. As the number of subscribers increases, the processing load of a microcomputer in the central station is increased, and data processing capacity is decreased. When various communication data are concentrated on a cable of the system, data may be erroneously processed.

On the other hand, in the CATV system, it is proposed to transmit a television broadcast signal of a pay channel, or that for a partial pay channel including a pay program within a given time range. When the television broadcast signal including the pay program is transmitted, many operations are needed such as checking of subscribers reserving the pay program, e.g., by polling, fetching of charge data from the subscriber who watched the pay program, and the like. However, if many such operations are processed by the microcomputer in the central station, this results in a complex program, degradation in data processing efficiency accompanying an increase in the number of subscribers, and an increase in occurrence of data error. An increase in the number of subscribers also causes noise concentration of upstream data in a trunk cable.

SUMMARY OF THE INVENTION

It is an object of the present invention to provide a communication data processing device of a CATV system which can eliminate a data processing load of a central station by transmitting a command in a downstream direction.

It is another object of the present invention to provide a communication data processing device of a CATV system which can simplify a communication method between a central station, an external control unit and a subscriber control unit by utilizing a command and improving a function of the external control unit, whereby a signal load on a communication trunk can be decreased and a program of a microcomputer can be simplified.

It is still another object of the present invention to provide a communication data processing device of a CATV system in which charge data with respect to a subscriber who has watched a pay program can be easily obtained at the central station.

It is still another object of the present invention to provide a communication data processing device of a CATV system in which identification of a subscriber who has reserved a pay program is performed by an external control unit separated from a central station, thereby eliminating a data processing load of the central station.

It is still another object of the present invention to provide a communication data processing device of a CATV system in which forced tuning of a television receiver of a subscriber who has reserved a pay program is performed by an external control unit independent of a central station, thereby reducing a data processing load of the central station.

It is an additional object of this invention to provide a bi-directional CATV system, which is capable of forcibly making operative the receiver power supply switch means of subscriber processing units (SPUs) authorized to receive a pay program even when these receiver power supply switch means have been inoperative, at the time the broadcasting of the pay program is started, thereby ensuring reception of the pay program.

It is another additional object of this invention to provide a CATV system capable of driving a subscriber assessment counter when the broadcasting of a pay program is started, and holding the charging of assessment to an SPU until the count of the associated counter reaches a predetermined value, thereby preventing assessment from being unreasonably charged when the associated SPU has not received the pay program.

In order to achieve the above objects of the present invention, there is provided a communication data processing device of a CATV system, comprising:

a cable for transmitting a communication signal consisting of forward data in a downstream direction and reverse data in an upstream direction, and a broadcast signal;

a converter tuner, connected to the cable, for performing channel selection of the broadcast signal and frequency conversion of a reception channel signal;

a drop cable for transmitting an output from the converter tuner to a subscriber processing unit;

a memory having at least a pay program map indicating a pay program of the broadcast signal and a reservation map for indicating reservation of the pay program;

means, connected to the drop cable, for storing reservation data in the reservation map locations corresponding to each subscriber in response to that subscriber's entry of data for reservation of the pay program;

means for detecting in response to the communication signal from the cable that the pay program has started;

means for searching the reservation map so as to detect the subscriber reserving the pay program upon detecting that the pay program has started; and means for supplying tuning data included in the pay program map to the converter tuner of the subscriber detected to have reserved the pay program.

In order to achieve additional objects, there is provided a bi-directional CATV system, comprising a head end for transmitting a broadcasting signal for bi-directional upstream/downstream communications control and for down-loading a command to subscriber processing units (SPUs); external control units (ECUs), located remote from the head end with feeder cables distributed therebetween by distributors provided on a trunk cable, each of the ECUs having broadcasting signal distribution control means for controlling distribution of the broadcasting signal to a plurality of associated subscriber processing units (SPUs) via a plurality of drop cables associated with the SPUs, first bi-directional communications control means for providing a bi-directional communication between the head end and the ECU, and second bi-directional communications control means for providing a bidirectional communication between the ECU and the associated SPUs via the drop cables; and SPUs, coupled to the respective ECUs, being subject to controlling the distribution of the broadcasting signal by the respective ECUs, and having functions to supply power to the respective ECUs via the respective drop cables to activate the respective ECUs and to transmit upstream data to the respective ECUs.

Each of the SPUs comprises: a power circuit; a broadcasting signal receiver; power-check data transmitting means for communicating with an associated ECU and transmitting power-check data, indicating whether or not the SPU is supplying power to the associated ECU, to the associated ECU via an upstream of an associated drop cable coupled to the associated ECU, in order for the associated ECU to recognize whether or not the SPU is supplying power to the associated ECU; pay-program reservation data transmitting means for producing pay-program reservation data to reserve reception of a pay program and for transmitting the pay-program reservation data to the associated ECU; and receiver power supply switch means, coupled to the broadcasting signal receiver, for performing a switching operation in accordance with a command to be executed by the associated ECU via a downstream of the associated drop cable.

Each of the ECUs comprises: drop cable terminals adapted to be coupled to associated SPUs via associated drop cables; subscriber boards, respectively coupled to the drop cable terminals, for distributing broadcasting signals including a pay-program signal to the associated SPUs via converter tuners; pay-program reception control data latch means, provided in correspondence with the subscriber boards, for causing the subscriber boards to latch control data necessary for the braodcasting signal receivers of the associated SPUs to receive a pay program; memory means for storing data used in a bi-directional communication between the first bi-directional communications control means and the head end, and data used in a bi-directional communication between the associated SPUs and the second bi-directional communicatiosn control means coupled to the drop cable terminals; an arithmetic and logic operation unit for controlling the first and second bi-directional communications control means and performing an artihmetic and logic operation according to a predetermined program; and forcible reception control means for detecting when transmission of a pay program from the head end is started, referring to the pay-program reservation data and the power check data stored in the memory means, so as to down-load a command to those SPUs whose receiver power supply switch means are opened, to forcibly close the receiver power supply switch means which have been opened, and supplying, the pay-program reception control data latch means, latch data necessary to distribute a pay-program signal to the subscriber boards in accordance with the pay-program reservation data; whereby even when the receiver power supply switch means of those SPUs which have an authorization to receive the pay program are opened at the time the pay-program starts, the receiver power supply switch means can be forcibly closed to receive the pay program.

BRIEF DESCRIPTION OF THE DRAWINGS

FIGS. 2A, 2B and 2C are block diagrams showing an embodiment of the present invention;

FIG. 5 is a detailed circuit diagram of an analog board of FIG. 2;

FIG. 13 shows a pay program map, a reservation map and a charge map; and

DETAILED DESCRIPTION OF THE PREFERRED EMBODIMENT

Figure 1:
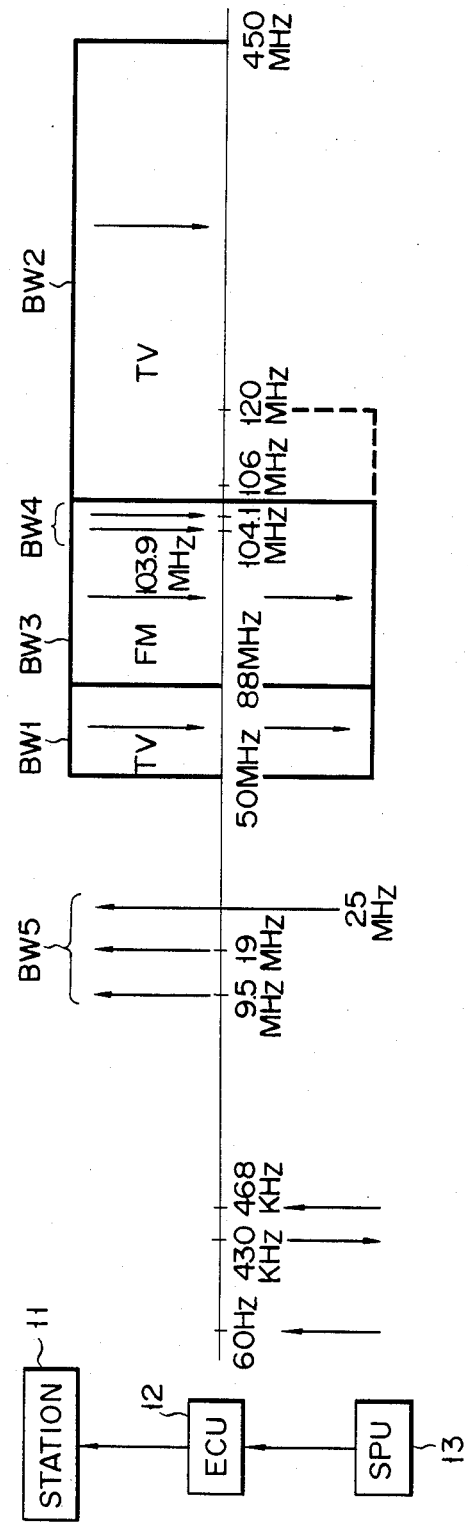
FIG. 1 is a view showing types of signals and bandwidths thereof in a CATV system according to the present invention.

FIG. 1 shows types of signals and bandwidths thereof in a CATV system. Arrows illustrated in respective bands indicate a (stream) direction of a signal. Reference numeral 11 denotes a central station; 12, an external control unit (to be referred to as ECU hereinafter); and 13, a subscriber processing unit (to be referred to as SPU hereinafter).

A The following bands of signals (down stream signals) are transmitted from the central station 11 to the ECU 12:

A-1 A low band BW1 (50 MHz to 88 MHz) and a high band BW2 (120 MHz to 450 MHz) of a television broadcast signal, A-2 A band BW3 (88 MHz to 120 MHz) for an FM broadcast signal, and A-3 A forward data transmission band BW4 (104 MHz±0.5 MHz).

The forward data transmission band BW4 is utilized for transmitting various data from the station 11 to the ECU 12, e.g., by an FSK modulation method. The data transmitted from the station 11 to the ECU 12 includes address data for designating the ECU 12, a command supplied to the ECU 12 or the SPU 13, channel contract data to be stored in the ECU 12, etc.

B A band BW5 for a signal transmitted to the station 11 from the ECU 12 is set as follows:

B-1 The band BW5 is utilized for transmitting reverse data. The band BW5 has, e.g., a main channel of 19 MHz and a subchannel of 9.5 MHz. The reverse data includes charge data, channel reservation data, data indicating an ON/OFF state of a power source of the SPU 13, and the like which are stored in the ECU 12.

These data are transmitted by the FSK modulation method.

B-2 Furthermore, the band BW5 has a security channel using, e.g., 25 MHz for a carrier.

The security channel is utilized for transmitting the emergency signal from the security sensor of the subscriber onto the trunk cable. The emergency signal includes a code of the subscriber, and is transmitted onto the trunk cable passing through the ECU 12.

C Data communication between the ECU 12 and the SPU 13 can be performed.

C-1 For this data communication, carriers of 430 kHz and 468 kHz in a VLF band are used, and an AM modulation method is used.

C-2 60 Hz is an AC power source frequency supplied from the SPU 13 to the ECU 12. In the CATV system, power used in the ECU 12 is supplied from the subscriber side.

FIG. 2 shows the central station 11, the ECU 12 and the SPU 13 in detail.

Figure 2A:
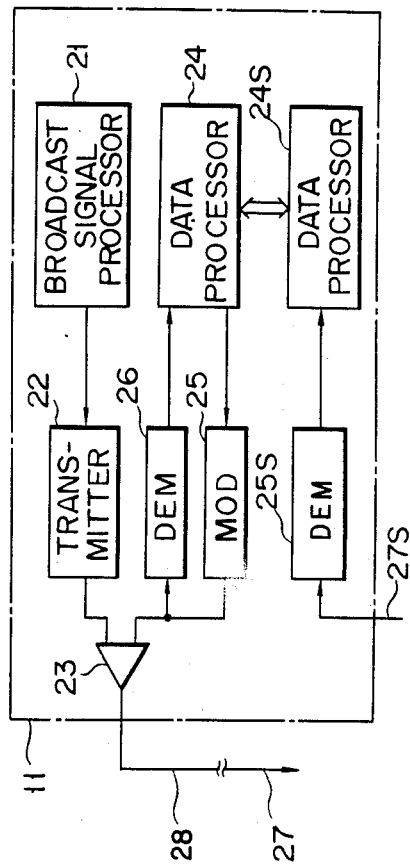

As shown in FIG. 2A, the station 11 comprises a broadcast signal processor 21 for producing a normal television signal, a contracted television signal and an FM signal, and a transmitter 22 for amplifying and transmitting the broadcast signal onto a trunk cable 28 through a bidirectional distributor 23. Furthermore, a data processor 24 is provided. The forward data from the data processor 24 is modulated by a modulator 25 by the FSK modulation method of 104 MHz±1 kHz, and the modulated forward data is transmitted onto the trunk cable 28 through the distributor 23. The reverse data signals of 19 MHz and 25 MHz (up stream signals) are received by a demodulator 26 through the distributor 23 and are demodulated. The demodulated reverse data signals are supplied to the data processor 24. Since the processor 24 includes a microcomputer, a display and the like, it can decrypt the content of the reverse data.

The trunk cable 28 connected to the station 11 is connected to a feeder cable 27. A number of external control units are provided along the feeder cable 27.

Furthermore, the station 11 can be provided with a demodulator 25S and a data processor 24S for receiving only the emergency signal. In this case, the demodulator 25S is connected to the security sensor arranged in each subscriber's house through a special-purpose security cable 27S. Also, the data processor 24S and the data processor 24 can communicate with each other.

Figure 2B:
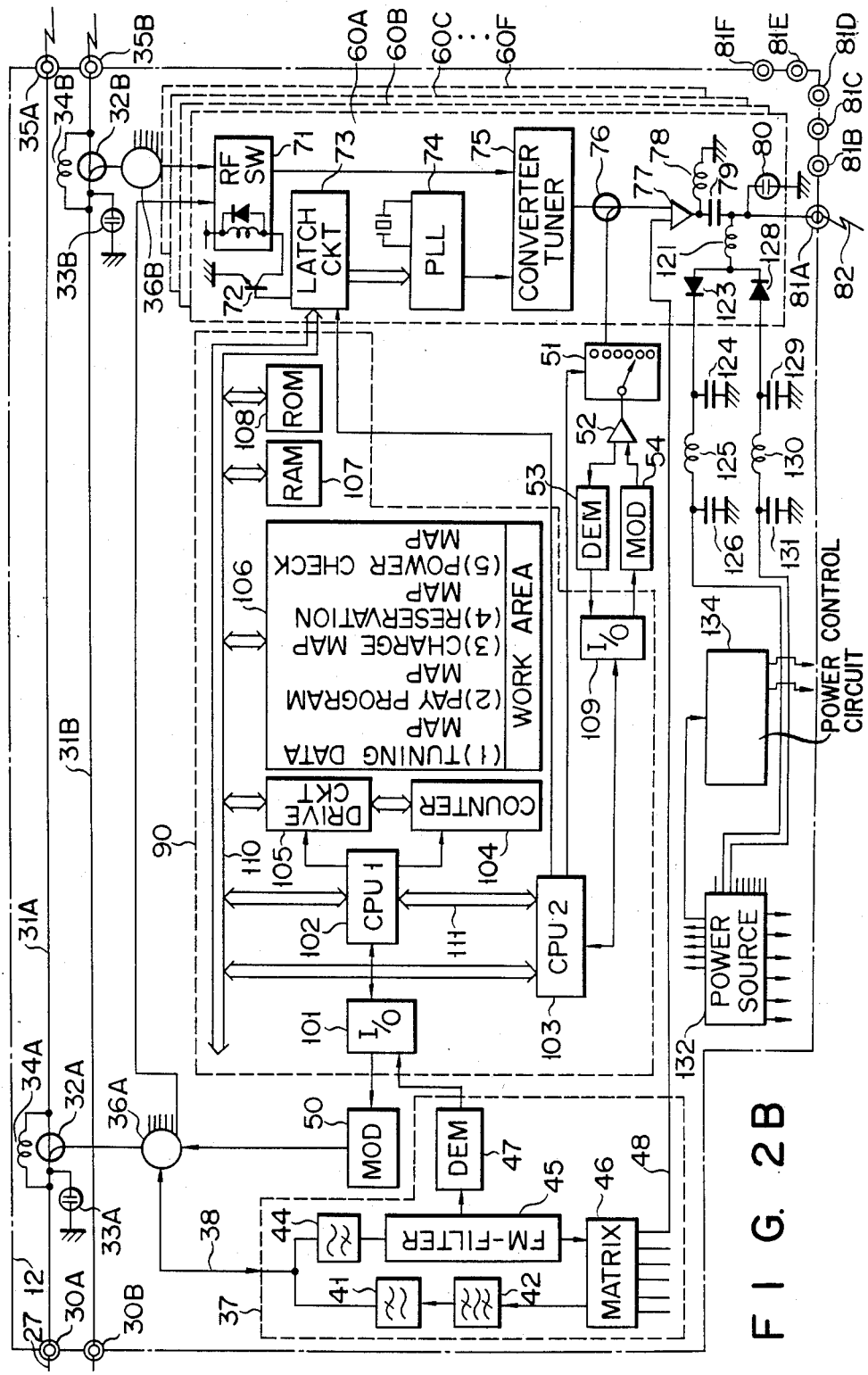

FIG. 2B shows one ECU 12. The feeder cable 27 is connected to a terminal 30A of the ECU 12, and is interconnected by an internal cable 31A. A directional coupler 32A is provided midway along the cable 31A. The coupler 32A is connected to an arrester 33A. A coil 34A connected in parallel with the coupler 32A is provided for passing the power source voltage supplied to a feeder cable amplifier (not shown). One terminal of the coupler 32A is connected to a bidirectional 6-way distributor 36A, and the other terminal of the coupler 32A is connected to a terminal 35A.

An internal cable 31B connected between terminals 30B and 35B, a directional coupler 32B provided along the cable 31B, an arrester 33B, a coil 34B and a bidirectional 6-way distributor 36B provided along the cable 31B are included for use when another feeder cable is connected.

A first terminal of the 6-way distributor 36A is connected to the coupler 32A, a second terminal thereof is connected to a terminal 38 of an analog board 37, and a third terminal thereof is connected to an output terminal of a modulator 50 for the reverse data. Furthermore, a fourth terminal of the 6-way distributor 36A is connected to one input terminal of an RF switch 71. Although a circuit of a subscriber board 60A for one subscriber's house is shown in FIG. 2B, in practice, six subscriber boards 60A to 60F are provided in the ECU 12. Therefore, the remaining fifth to ninth terminals of the 6-way distributor 36A are connected to corresponding RF switches of the boards 60B to 60F.

The board 60A has the following arrangement. One of outputs from the distributors 36A and 36B is selected by the switch 71. The switch 71 is controlled by a transistor 72. The transistor 72 is turned on/off in response to data latched in a latch circuit 73. The output from the RF switch 71 is supplied to a converter tuner 75. The tuner 75 receives the television broadcast signal, and converts it to, e.g., a third or fifth channel television signal. The television broadcast signals for 60 channels are transmitted by utilizing the bands BW1 and BW2 shown in FIG. 1. The tuner 75 selects one signal among the broadcast signals for 60 channels, and converts it into the third or fifth channel television signal.

A switching operation of the reception channel of the tuner 75 is performed by changing the data in the latch circuit 73. The latched data in the circuit 73 is supplied from a digital board 90 (to be described later). The digital board 90 is responsive to an operation of the subscriber (channel request) or command (force tuning) from the central station for causing the latch circuit 73 to latch the data therein.

The output data from the latch circuit 73 determines an oscillation frequency of a phase locked loop circuit (to be referred to as PLL circuit hereinafter) 74. An oscillation signal from the PLL circuit 74 is utilized as a local oscillation signal of the tuner 75. If the data in the latch circuit 73 is changed, the reception channel of the tuner 75 is also changed.

The television signal from the tuner 75 is supplied to a terminal 81A through a directional coupler 76, a bidirectional distributor 77 and a capacitor 79. A coil 78 represents a high impedance with respect to an RF signal. Reference numeral 80 denotes an arrester. Other subscriber boards 60B to 60F have the same arrangement, and each has a latch circuit to which an output from a CPU 103 of a digital board 90 is supplied. Outputs from the respective converter tuners in the boards 60B to 60F are supplied to terminals 81B to 81F.

Next, the analog board 37 will be described. The output from the 6-way distributor 36A is supplied to a high-pass filter 44. The filter 44 can pass the FM signal in the FM bands BW3 and BW4 shown in FIG. 1. An output from the filter 44 is supplied to an FM separation filter 45. The filter 45 separates a signal in the band BW3 and a signal in the band BW4 (FIG. 1) of the FM signal from the filter 44. The signal in the band BW3 is a signal for a music program, and is supplied to a matrix circuit 46. The signal in the band BW4 comprises various data signals transmitted from the central station 11 and is supplied to a demodulator 47. The demodulator 47 demodulates the FM signal transmitted by the FSK method, and supplies the demodulated signal to an input/output (I/O) port 101 of the digital board 90. The FM signal passing through the circuit 46 is supplied to the bidirectional distributor 77 through a line 48. Therefore, the FM broadcast signal and the television signal from the tuner 75 are obtained from the output terminal 81A, and these signals are transmitted to a subscriber's house through a drop cable 82.

The line 48 is provided for an FM broadcast signal when a subscriber subscribes to a CATV company. Therefore, a plurality of output terminals for respective subscribers are provided in the matrix circuit 46 in order to distribute the FM broadcast signal.

Furthermore, the analog board 37 has an emergency signal transmission path in an up stream direction consisting only of passive elements. The emergency signal is generated from the security sensor of the SPU. The emergency signal is included in the band BW5 shown in FIG. 1 and is an FSK modulation signal of 25 MHz.

The emergency signal is supplied to the feeder cable 27 through the drop cable 82, the terminal 81A, a capacitor 79, the distributor 77, the line 48, the circuit 46, a band-pass filter 42 and a low-pass filter 41 via the distributor 36A and the coupler 32A. The band-pass filter 42 has a narrow bandwidth to pass a 25-MHz signal and the frequency of this 25-MHz signal is restricted by the band-pass filter 42 and low pass filter 41, thus preventing noise from being generated in the feeder cable 27. The emergency signal (25-MHz signal) for six subscribers is transferred to the feeder cable 27 through the matrix circuit 46 and filters 42 and 41. The low-pass filter 41 can pass a signal of 30 MHz or lower. In this manner, the emergency signal transmission path includes no active element and is constituted by only passive elements. Therefore, even if the power source in the ECU 12 is turned off, if only the emergency signal is generated from the security sensor, it can be transmitted onto the feeder cable 27.

The emergency signal includes an identification code of each subscriber. When the station 11 receives the emergency signal, it can determine therefrom which subscriber is in an emergency state.

A power source in respective circuits in the ECU 12 (FIG. 2B) is supplied from the subscriber side.

In other words, a commercial AC power source voltage is supplied to the anode of a diode 123 and the cathode of a diode 128 through the drop cable 82, the terminal 81A and a coil 121. A positive half cycle of the AC voltage is rectified by the diode 123, and is smoothed by a capacitor 124, a coil 125 and a capacitor 126. The smoothed positive voltage is supplied to a common power source circuit 132. A negative half cycle of the AC voltage is rectified by the diode 128 and is smoothed by a capacitor 129, a coil 130 and a capacitor 131. The smoothed negative voltage is also supplied to the circuit 132. In FIG. 2B, only a power supply path from the subscriber board 60A is shown. Power is supplied to the circuit 132 from any of subscriber boards 60A to 60F.

The circuit 132 is used as a power source of a circuit in the digital board 90, the demodulator 47, modulators 50 and 54, a demodulator 53, and a polling and selecting circuit 51.

Part of the output voltage from the circuit 132 is supplied to an individual power source circuit 134. The power source circuit 132 supplies power to the subscriber boards 60A-60F as well as the remaining internal circuits and the power control circuit 134. The power control circuit 134 control power distribution to the subscriber boards 60A-60F. That is, the power supply to the subscriber boards 60A-60F is controlled by the power control circuit 134.

A communication system and the digital board 90 in the ECU 12 will be described hereinafter.

The I/O port 101 of the board 90 can receive forward data from the central station 11, and can transmit reverse data from the ECU 12 to the station 11. The reverse data is modulated by the modulator 50 into the FSK modulation signal of 19 MHz or 9.5 MHz in the band BW5 shown in FIG. 1. The up stream signal from the modulator 50 is supplied to the feeder cable 27 through the 6-way distributor 36A and the directional coupler 32A.

The down stream signal is demodulated by the demodulator 47 and the demodulated signal is supplied to the I/O port 101. The forward data from the I/O port 101 is read by a central processing unit (to be referred to as a first CPU hereinafter) 102. The first CPU 102 is connected to random-access memories (to be referred to as RAMs) 106 and 107 and a read-only memory (to be referred to as a ROM hereinafter) 108 through a bus 110, and is also connected to the second CPU 103 through a bus 111. The second CPU 103 is connected to the bus 110. The ROM 108 stores a fixed program for driving the first and second CPUs 102 and 103.

The RAM 107 stores various commands sent from the station 11. The various commands include a command to forcibly turn on the power switch of a TV received of a subscriber, a display command used when the ECU 12 communicates with the SPU 13, and a command used when the ECU 12 controls an internal CPU of the SPU 13. The internal CPU in the SPU 13 can start the program for displaying an operation procedure or can turn on a power switch in response to the command.

The RAM 106 stores the pay program data, reservation data, charge data of the subscribers, access codes, and the like, and can also store power ON/OFF check data of the SPUs. The power ON/OFF check data represents whether or not the plug 160 shown in FIG. 2C is coupled to a commercial power source to activate the SPUs.

The first CPU 102 reads out the charge data of the subscribers in the RAM 106 so as to communicate with the station 11, and transmits it to the station 11 through the I/O port 101. This upstream data communication is performed when a request from the station 11 is present. The first CPU 102 can transmit the power ON/OFF check data of the SPUs to the station 11 in response to a request from the station 11. The upstream data communication can also be performed when a readout command from a security company is present.

The first CPU 102 can access the RAM 106 to store the pay program data transmitted from the station 11. The first CPU 102 can also access the RAM 107 to store a command sent from the station 11.

The second CPU 103 can communicate with the respective SPUs through an I/O port 109, the modulator 54, the demodulator 53, a bidirectional distributor 52, and the polling and selecting circuit 51. The circuit 51 can connect the distributor 52 and the respective subscribers in a time-divisional manner, and is controlled by the second CPU 103.

An upstream signal from the SPU is demodulated by the demodulator 53 and the demodulated data is read by the second CPU 103 through the I/O port 109. The CPU 103 controls the polling means, i.e., the circuit 51, thus executing the address polling with respect to the individual SPUs. In this case, when upstream data from any of the SPUs is present, the data communication between this SPU and the associated ECU starts. The signal from the subscriber is sent in such a manner that the carrier of 468 kHz shown in FIG. 1 is 100% AM modulated or 0% AM modulated. When the carrier is 100% AM modulated, the CPU 103 determines as data "1", and when the carrier is 0% AM modulated, it determines as data "0".

When the data changes between "1" and "0", the CPU 103 fixes a selection of the polling and selecting circuit 51 for a predetermined period of time, and communicates with a target SPU. In other words, when the data changes between "1" and "0", the CPU 103 determines that the SPU requests communication. A period during which the CPU 103 selects one SPU is determined to be substantially the same as that for completing one key action of the SPU 13. When this period has elapsed, the circuit 51 resumes its operation, and checks if data from another SPU is present. When the SPU communicates with the CPU 103, the data from the CPU 103 is modulated by the modulator 54. In this case, the carrier frequency is 430 kHz, as shown in FIG. 1. In this manner, the CPU 103 can communicate with six SPUs in a time-divisional manner.

While the CPU 103 communicates with the SPU, the CPU 103 reads out the command stored in the RAM 107, and can transmit it to the corresponding SPU 13. The content of the command may represent a display of the operation procedures of the SPU 13. Therefore, if the subscriber does not know an operation of the SPU 13 in advance, he can operate the SPU 13 in accordance with the command sent from the CPU 103.

The second CPU 103 can perform power ON/OFF check of the SPU 13. While the polling and selecting circuit 51 sequentially performs polling of the respective SPUs (to be referred to as a drop polling mode hereinafter), the CPU 103 checks if the data "0" is continuously transmitted from the SPUs.

When the data "0" is continuously transmitted from the SPU 13 and the data does not change between "0" and "1", the carrier of 468 kHz is always transmitted. The SPU 13 is programmed to transmit the carrier of 468 kHz when the power source is kept on.

Now assuming that the CPU 103 detects a subscriber who stops transmitting the continuous carrier of 468 kHz. The CPU 103 determines that the power source of the SPU 13 of the corresponding subscriber is turned off, or an abnormality has occurred in the drop cable of the subscriber. In this case, the CPU 103 writes power ON/OFF detection data in a power check memory map 106A (FIG. 4) of the RAM 106.

The map 106A has six subscriber areas and the power ON/OFF detection data is written in the corresponding subscriber area by the CPU 103. Therefore, when the data in the map 106A is transmitted to the station 11, the station 11 can detect which subscriber's unit is in the abnormal state.

When the station 11 detects the SPU 13 having the power source turned off, the CATV company or security company can ask the corresponding subscriber to check the power source.

Furthermore, the CPU 103 has a charge data processing function and a channel selection function.

When channel request data is transmitted from a SPU, the CPU 103 supplies channel selection data to the latch circuit (e.g., 73 in FIG. 2B) of the corresponding SPU. Thus, the converter tuner 75 selects the television signal of the channel requested by the subscriber.

When a pay program starts, the CPU 103 causes a charge counter 104 to start counting. When the count of the counter 104 has reached 30 minutes, charging is made to the subscriber watching the pay program. That is, the charge map of the subscriber watching the pay program is provided in the RAM 106. The subscriber watching the pay program is detected by the CPU 103. Therefore, after the predetermined time has passed in the counter 104, the CPU 103 writes the charge data in the charge map of the corresponding subscriber through a drive circuit 105. The data in the charge map is transmitted to the central station 11 side when polling is made by the station 11.

The SPU 13 shown in FIG. 2C will be described. The drop cable 82 is connected to a terminal 140. The terminal 140 is connected to a first terminal of a diplex filter 141 and one terminal of a coil 142. The filter 141 has bandwidth characteristics in which a VLF pass band, 25 MHz pass band, and FM and TV signal pass bands are separated. The coil 142 passes an AC power source voltage.

A second terminal of the filter 141 is connected to the other terminal of the coil 142, one terminal of a capacitor 143, and one terminal of a coil 168, and a third terminal thereof is connected to a security sensor connecting terminal 163 through a capacitor 170.

The other terminal of the capacitor 143 is connected to a first terminal of a directional coupler 145 and grounded through a coil 144. A second terminal of the coupler 145 is connected to a distributor 146 and a third terminal thereof is connected to a bidirectional distributor 151.

The television signal frequency-modulated by the converter tuner 75 or the FM broadcast signal passing through the matrix circuit 46 (FIG. 2B) is supplied to the distributor 146 through the terminal 140, the filter 141, the capacitor 143, and the coupler 145. The distributor 146 is connected to a television receiver 147 through a terminal 146A, and is connected to an FM receiver 149 through a terminal 146B.

A power plug 148 of the receiver 147 is connected to an outlet of the SPU 13, and a power plug 150 of the receiver 149 is connected to an outlet 162.

The distributor 151 is connected to a demodulator 152 and the demodulated output from the demodulator 152 is supplied to a CPU 153. The demodulator 152 demodulates the communication data of 430 kHz transmitted from the ECU 12. The data to be transmitted from the CPU 153 to the ECU 12 side is modulated by a modulator 156, and the modulated signal is supplied to the drop cable 82 through the distributor 151, the coupler 145, the capacitor 143 and the filter 141.

The CPU 153 is connected to a display 154 and a keyboard 155. The subscriber operates the keyboard 155 upon observing the display 154, thus communicating with the ECU 12.

A power source system of the SPU 13 will be described hereinafter.

A commercial AC power source is supplied to a primary coil 165 of a transformer 164 through a plug 160 (FIG. 2C). One terminal 165A of the coil 165 is connected to one terminal of an outlet 161 through a switch 157. The other terminal of the outlet 161 is connected to the other terminal 165B of the coil 165. The switch 157 is ON/OFF controlled by the CPU 153. For example, when the subscriber operates the keyboard 155 and instructs to turn on the TV receiver 147, the switch 157 is turned on. Further, when a pay program starts, the switch 157 is forcibly turned on by the ECU 12. Furthermore, the terminals 165A and 165B of the coil 165 are connected to an outlet 162 for the FM receiver 149.

Coils 166, 167 and 169 are provided at the secondary side of the transformer 164.

One terminal of the coil 166 is grounded, and the other terminal thereof is connected to a power source circuit 158. The circuit 158 is provided for producing various DC voltages used in the SPU 13. One terminal of the coil 167 is grounded and the other terminal thereof is connected to the second terminal of the filter 141 through a coil 168. The coils 167 and 168 are provided for supplying AC power to the ECU 12 through the cable 82.

One terminal of the coil 169 is grounded and the other terminal thereof is connected to a security sensor 171 through a terminal 163. The coil 169 supplies power to the sensor 171.

The sensor 171 generates an emergency signal when an emergency occurs in a subscriber's house. The emergency signal is a modulated signal of 25 MHz, and includes a specific code for a contracted subscriber or the contracted subcriber's area. The modulated signal also includes an identification code of the type of emergency, for example, a fire, burglary, flood, and the like.

The emergency signal is transmitted onto the feeder cable 27 through a cable 172, the terminal 163, a capacitor 170, the filter 141, the cable 82, the terminal 81A, the capacitor 79, the distributor 77, the line 48 (FIG. 2B), the matrix circuit 46, the filters 42 and 41, the distributor 36A and the coupler 32A. The above emergency signal transmission path does not include active elements. Therefore, even if the power source circuits 132 and 134 shown in FIG. 2B are turned off, the emergency signal can be transmitted onto the feeder cable 27.

Power is always supplied to the sensor 171 through the coil 169. Furthermore, the sensor 171 has a back-up capacitor so as to operate even if power is not supplied thereto for, e.g., several tens of hours. Therefore, if the plug 160 is disengaged from the AC outlet, the operation of the sensor 171 can be temporarily ensured.

Furthermore, the operation of the security system is guaranteed by utilizing the CATV system. In other words, the CPU 153 in the SPU 13 is set to continuously generate the data "0" while power is supplied. Thus, when the CPU 153 generates data "1", this indicates a malfunction of the SPU 13, disengagement of the plug 160, or disconnection of the cable 82.

On the other hand, the second CPU 103 of the ECU 12 has a function for checking the power ON/OFF data, which represents whether or not the SPU is powered through the plug 160.

Figure 3:
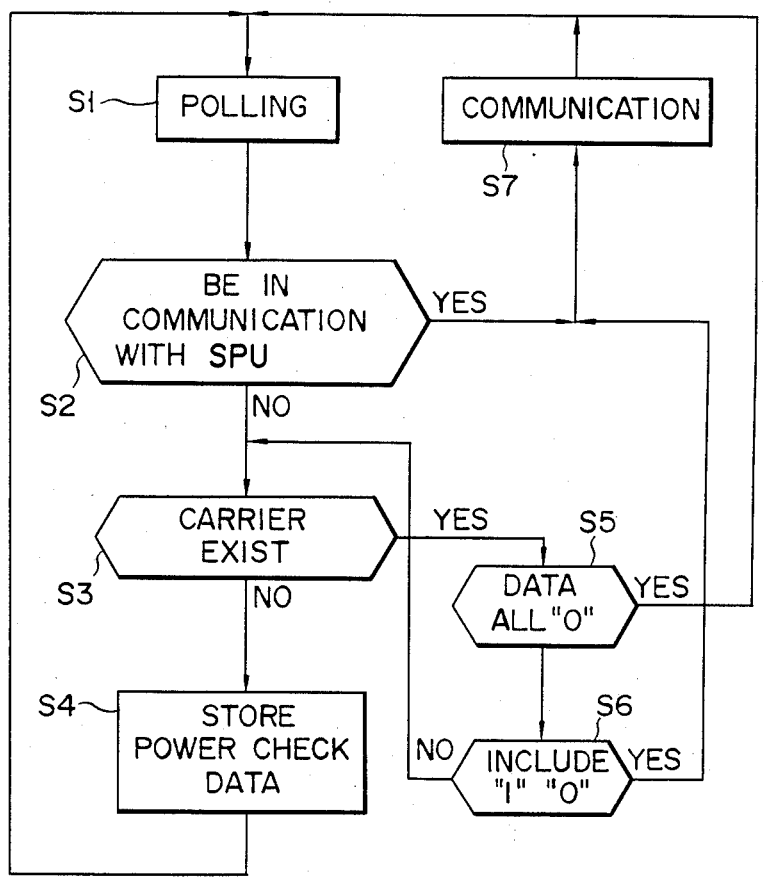
FIG. 3 is a flow chart for obtaining power source check data.

FIG. 3 shows a flow chart to check the power ON/OFF state of a SPU during a period different from a data communication period in which the SPU exchanges data with the ECU associated with this SPU. In step S1, polling is performed so as to check if the transmission data from the respective subscribers is present. During the polling, in step S2, it is checked if the CPU 103 is in communication with the subscriber who is connected. If YES in step S2, the flow advances to step S7, and communication is made. Then, the flow returns to step S1. If NO in step S2, i.e., if the subscriber who is connected and designated does not require to communicate, the flow advances to step S3, and it is checked if the carrier (468 kHz) of this SPU is present. This is because the SPU continuously outputs a carrier in a period other than the period in which the SPU exchanges data with the ECU through the polling control.

If NO in step S3, it is determined that an abnormality has occurred to the unit of this subscriber. Therefore, in this case, the power ON/OFF detection data is written in the power check memory of the corresponding subscriber in step S4, and the flow returns to step S1. As has been described with reference to FIG. 2B, the power check memory area is provided in the RAM 106.

If YES in step S3, the flow advances to step S5, and it is checked if the transmission data is all "0". If YES in step S5, since no abnormality exists with this subscriber, the flow returns to step S1.

If NO in step S5, the flow advances to step S6. In step S6, it is checked if the data from the SPU includes "1" and "0". If YES in step S6, it is determined that the SPU has started communication, and the flow advances to step S7. If NO in step S6, i.e., if the transmission data does not include "1" and "0" for a predetermined period of time, the flow returns to step S3, and it is checked if the carrier is present.

As described above, the second CPU 103 can check the power check data of the respective subscribers. The power check data stored in the RAM 106 is transmitted to the station 11 by the first CPU 102 in response to a request from the station 11. A period for requesting the power check data from the station 11 is shorter than, e.g., that for discharging a voltage from a back-up capacitor 173 shown in FIG. 2C.

The data processor 24 of the station 11 receives the power ON/OFF check data so as to detect a SPU that is not powered. The unpowered SPU is listed up, e.g., by a printer of the station 11.

Figure 4:
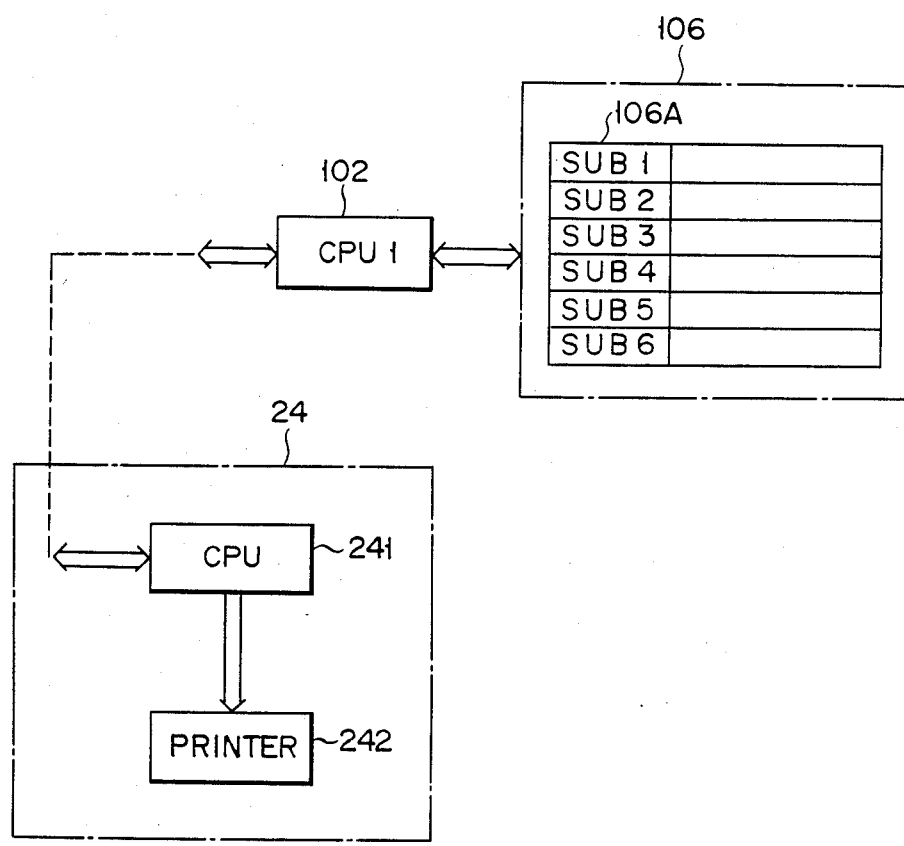
FIG. 4 is a block diagram of a system for supplying the power source check data to a central station.

FIG. 4 shows the CPU 102 and the RAM 106 in the ECU 12 and the processor 24 in the station 11. The processor 24 has a CPU 241 and a printer 242. When the CPU 241 transmits to the CPU 102 a request signal for the power check data, the CPU 102 starts reading out the data from the power check memory 106A. The readout data is transmitted to the CPU 241. The power check memory 106A has storage areas corresponding to six subscribers (SUB 1 to SUB 6). Data indicating codes of the respective subscribers and whether or not an abnormality has occurred in the power source can be stored in respective storage areas. The CPU 241 decodes the data from the CPU 102, and causes the printer 242 to print the code, a name, a telephone number, etc. of the subscriber having the abnormality data. Thus, the CATV company or the security company calls the subscriber having the power ON/OFF data to ask the subscriber to check the plug 160 (FIG. 2C). Thus, a stand-by state of the sensor 171 can be ensured.

It should be noted that once the data stored in the power check memory 106A is transmitted to the station 11, it is erased. Therefore, new power check data is stored in the memory 106A.

FIG. 5 shows the circuit in the analog board 37 shown in FIG. 2B in more detail.

An FM signal supplied to the terminal 38 is supplied to the FM separation filter 45 through the high-pass filter 44. The filter 45 is constituted by a band-pass filter having a center frequency of 100 MHz, an amplifier 452, a SAW filter 453, an amplifier 454, a band-pass filter 455, and a buffer amplifier 456. The output from the buffer amplifier 456 is supplied to the matrix circuit 46 as an FM broadcast signal. The output from the amplifier 454 is supplied to the demodulator 47.

The demodulator 47 is constituted by an oscillator 471, a mixer 472, an amplifier 473, a detector 474, and a comparator 475. The FM signal including the forward data of 104 MHz is converted into a signal of 4.5 MHz by the mixer 472, and is detected by the detector 474. The detection output is compared with a reference voltage by the comparator 475, and is converted into digital data of logic level "1" or "0". The demodulated forward data is fetched by the CPU 102 shown in FIG. 2B.

In the matrix circuit 46, the output terminal of the amplifier 456 is connected to terminals 46A to 46F for respective subscribers. The terminals 46A to 46F are also connected to security contract terminals 461A to 461F. Referring to FIG. 5, the subscriber using the terminal 46A has a contract with the subscriber using the terminal 46F. That is, the terminals 461A and 461F are short-circuited. Therefore, when the emergency signal is generated from the security sensor 171 or 171B, the emergency signal is supplied to the terminal 38 through the filters 42 and 41.

The sensors 171 and 171B can include an alarm unit, a display, and receiver responsive to the emergency signal of 25 MHz.

When connecting terminals A1 and B1 of the alarm unit responsive to the emergency signal are provided in the sensors 171 and 171B, the following effect can be obtained. Assuming that an emergency occurs in a subscriber's house equipped with the sensor 171, this state can be signaled to a subscriber equipped with the sensor 171B. That is, neighboring subscribers can know that an emergency has occurred in the neighborhood. Thus, local fire and crime prevention can be performed.

Figure 6:
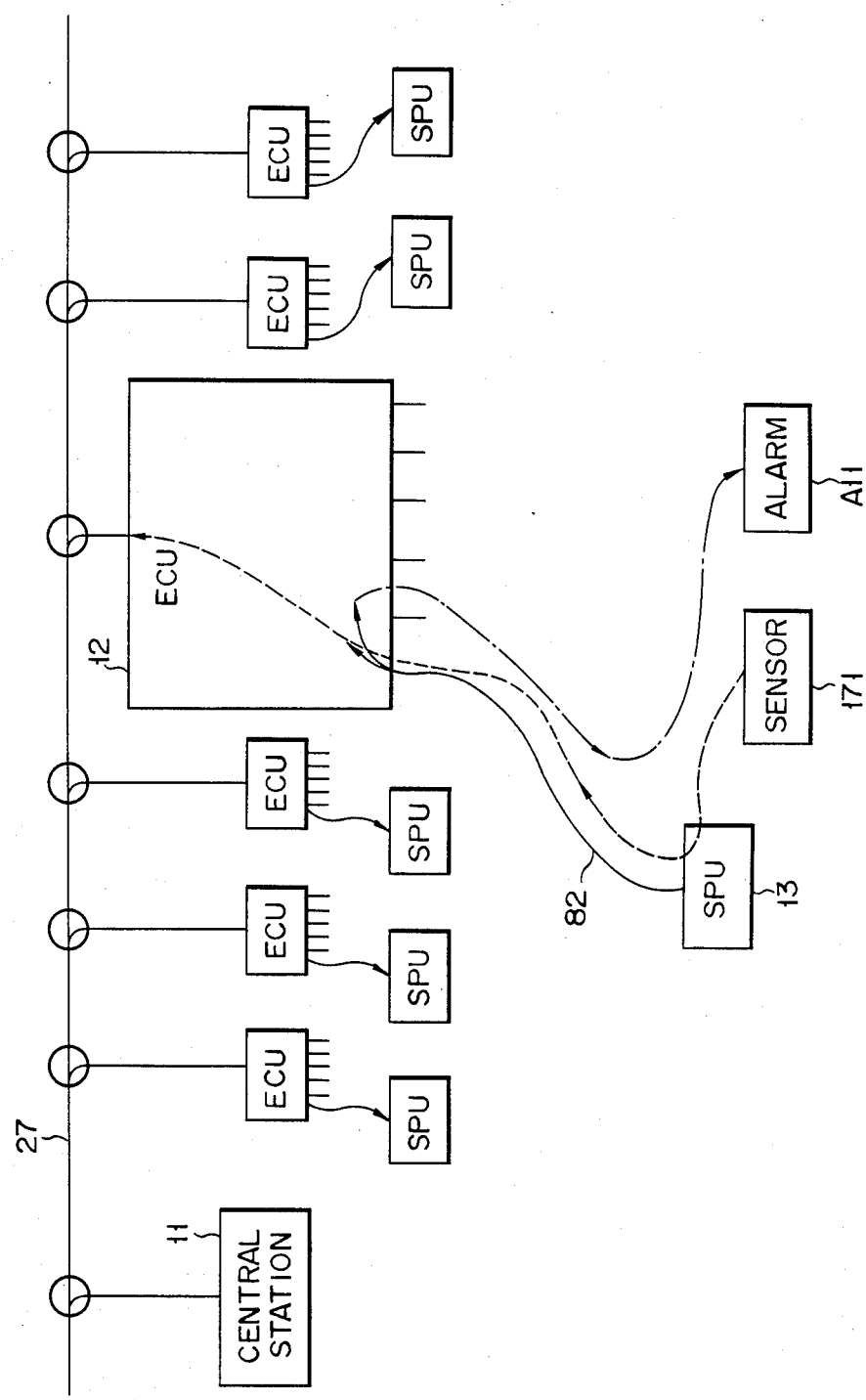
FIG. 6 is a block diagram of the overall CATV system according to the present invention.

FIG. 6 shows the emergency signal transmission path. When the sensor 171 is operated in a subscriber's house equipped with the SPU 13, the emergency signal is transmitted to the station 11 through a path indicated by the broken line. In this case, since the emergency signal includes the identification code of the corresponding subscriber, the station 11 can determine the subscriber's house in which the emergency has occurred. When the emergency signal is generated from the sensor 171, an alarm signal is supplied to an alarm unit (All) through a transmission path indicated by the alternate long and short dashed line. The alarm unit All is not only a display, but can be a means for driving motors for a fire extinguisher, a siren, a drain pump and the like. Such equipment is selected in accordance with the state of the emergency. In this case, the emergency signal includes an identification code for indicating the type of emergency, for example, a fire, flood, and the like.

Data communication between the central station 11 and the ECU 12 and between the ECU 12 and the SPU 13 will be described in more detail.

Figure 7:
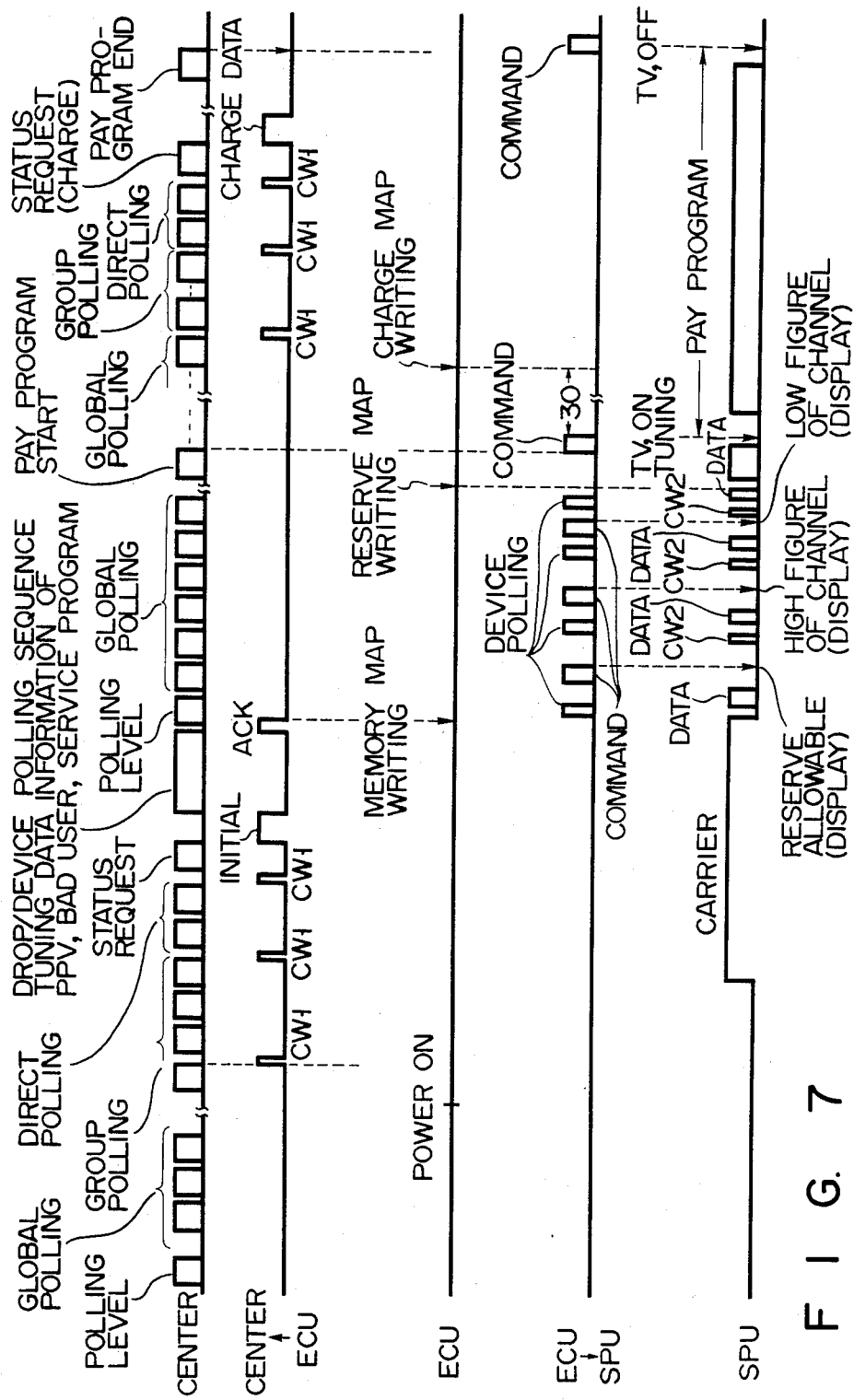
FIG. 7 is a timing chart showing an example of communication of the CATV system according to the present invention.

FIG. 7 shows a process wherein power is supplied to the ECU, a subscriber reserves a pay program, and the pay program is broadcast.

The station 11 selects a polling level, and performs global polling with respect to all the ECUs 12. On the other hand, when the power source is turned on in the ECU 12, the ECU 12 transmits the carrier CW1 to the station 11 side in order to request communication with the station 11.

When the station 11 detects the carrier CW1 during the global polling, it performs group polling. In other words, the station 11 performs polling of an area where the ECU generating the carrier CW1 exists. When the station 11 detects the next carrier CW1 during the group polling, it performs direct polling. In this case, the station 11 directly designates the ECU which has generated the carrier CW1. The ECU directly designated by the station 11 transmits the third carrier CW1. When the third carrier CW1 is detected by the station 11, the station 11 supplies a status request to the corresponding ECU 12.

Note that the ECU 12 is in a state immediately after it is energized. Thus, the ECU 12 supplies to the station 11 data indicating that it is in an initial state. In this case, the ECU 12 must be initialized. Thus, the station 11 supplies various initial data to the ECU 12.

The initial data includes a program representing a priority according to which the ECU 12 performs polling with respect to the SPUs 13, information for pay programs, tuning data for the pay programs, information of subscribers who has not paid a predetermined charge for the pay program, and various service programs.

The ECU 12 receives the above initial data and writes the data in a memory map, and then transmits an acknowledge signal ACK to the station 11. The station 11 performs the global polling again in response to the signal ACK.

Next, data communication between the ECU and a plurality of SPUs will be described.

The ECU 12 performs polling with respect to a plurality of subscribers (device polling). When the ECU 12 detects a SPU which made a key operation during the device polling, the ECU 12 causes the corresponding SPU to stop generating the carrier and detects the data (a predetermined response signal, e.g., a change between "1" and "0"). When the content of the data from the SPU indicates, for example, that a subscriber wants to reserve a pay program, the ECU 12 supplies a command to the corresponding SPU and is switched into the polling state. Reservation enable display is performed at the SPU 13 side by means of this command. The subscriber checks this display, and operates a key corresponding to an upper digit of a channel of the pay program. Thus, the SPU 13 transmits the carrier CW2 and thereafter supplies data. When the ECU 12 detects the carrier CW2, the ECU 12 receives the upper digit data of the channel, supplies a command, and is switched to the polling state. The command causes the SPU 13 to display the upper digit of the channel. The subscriber checks the upper digit of the channel displayed, and operates a key so as to provide a lower digit of the channel. When the ECU 12 detects the key operation, the ECU 12 receives the data from the SPU 13 and subsequently sends a command to the SPU 13. This command causes the SPU 13 to display the lower digit of the channel.

Furthermore, the ECU 12 writes the reservation data of the corresponding subscriber's area in the pay program reservation map. When the subscriber wants to supply other data to the ECU 12, the subscriber can operate keys in the same manner as described above.

Assuming that the broadcast of the pay program starts, the ECU 12 searches which subscribers have reserved this pay program, i.e., detects data "1" or "0" in the reservation map. The pay program is indicated by the content of the forward data.

When the subscriber who has reserved the pay program to be transmitted is detected, the ECU 12 supplies a command to the corresponding SPU. The command turns on a television receiver of the corresponding subscriber. In the ECU 12, tuning processing is performed with respect to the converter tuner of the subscriber board.

Furthermore, when the subscriber has watched the pay program for, e.g., 30 minutes or more, charge data processing is performed in the ECU 12. That is, "frequency 1" is written in the charge map of the corresponding subscriber.

As described above, after the charge data is written in the charge map, the ECU transmits the carrier CW1 onto the feeder cable so as to communicate with the station 11. The station 11 fetches the charge data of the corresponding ECU 12 through steps of global polling, group polling and direct polling.

When the pay program ends, a pay program end signal is transmitted from the station 11. The ECU 12 supplies a command to the corresponding SPU in response to this signal, thus turning off the television receiver.

Figure 8:
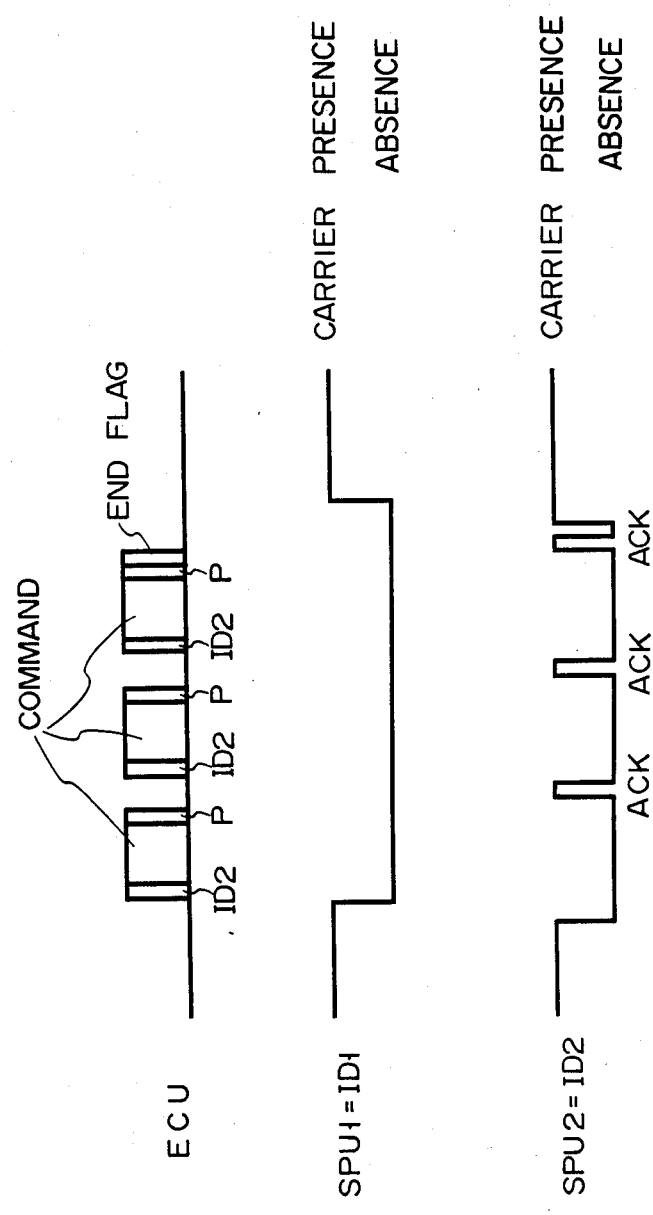
FIG. 8 is a timing chart showing an example of communication between an external control unit and a subscriber processing unit.

FIG. 8 shows a communication content between the external control unit and the subscriber processing unit in more detail. Assume that an external control unit ECU requests to communicate with a subscriber processing unit SPU2. The unit ECU stops the carriers of respective subscriber processing units SPU1 and SPU2.

During device polling, the commands each including an identification code ID2 and a parity-check code P are transmitted to the unit SPU2 for a predetermined period of time. The commands are stored in the RAM 107 shown in FIG. 2B. Every time the unit SPU2 receives one command, it generates an acknowledge pulse ACK. Every time the unit ECU receives the pulse ACK, the unit ECU transmits the next command. The last command is transmitted together with an end flag. Thereafter, the device polling is resumed.

As described above, when the commands are supplied from the unit ECU to the corresponding subscriber processing unit, the subscriber processing unit simply generates the acknowledge pulse ACK every time it receives the command. Thus, the subscriber processing unit serves as an I/0 port. That is, the commands simply pass through the subscriber processing unit and, for example, drive a display.

Figure 9:
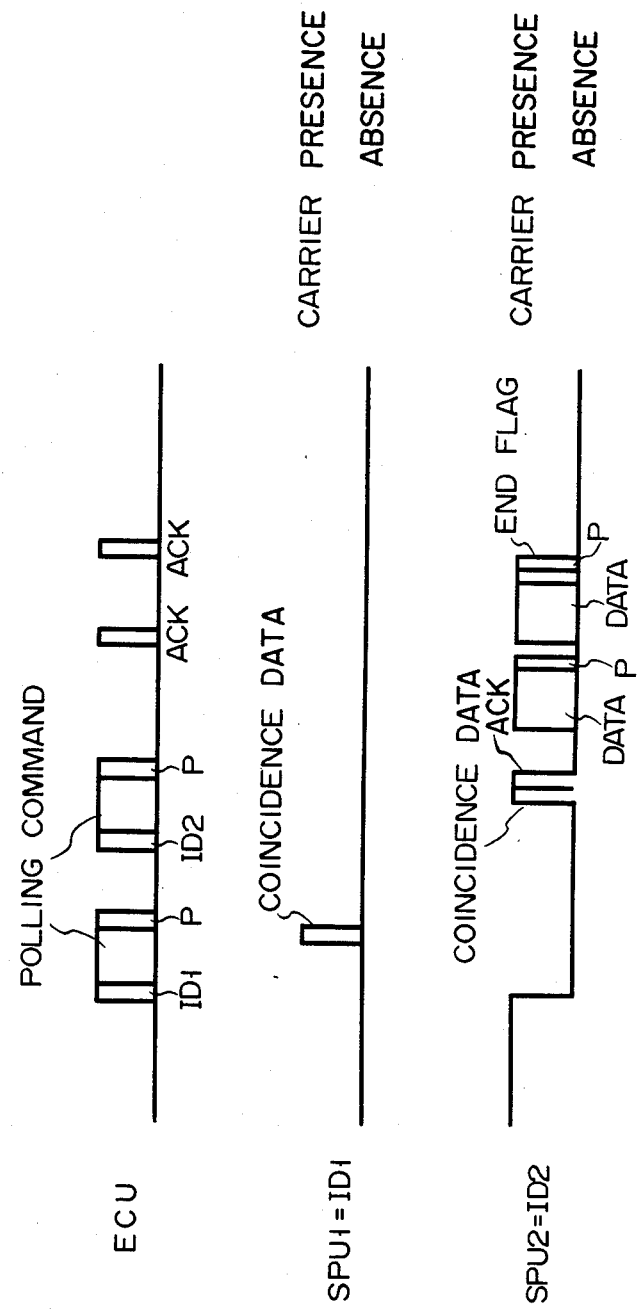
FIG. 9 is a timing chart showing another example of communication between the external control unit and the subscriber processing unit.

FIG. 9 shows data communication when the commands are sent from the unit SPU2 to the unit ECU. Now assume that the unit SPU2 requests to communicate with the unit ECU. During the device polling, the unit ECU generates polling commands including the identification codes ID1 and ID2 of the respective SPUS in a time-divisional manner. The subscriber processing unit generates a coincidence pulse when the identification code thereof coincides with that sent with the polling command. Referring to FIG. 9, the unit SPU2 requests the communication. When the unit SPU2 is designated during polling, it generates the acknowledge pulse together with the coincidence pulse. Thus, the unit ECU starts communication with the unit SPU2 and accepts the data therefrom. After accepting the data from the unit SPU2, the unit ECU generates the acknowledge pulse ACK. After receiving the pulse ACK from the unit ECU, the unit SPU2 transmits the next data. The data finally generated from the unit SPU2 includes an end flag indicating an end of data transmission. When the unit ECU detects the end flag, it is switched to the device polling state again.

Figure 10:
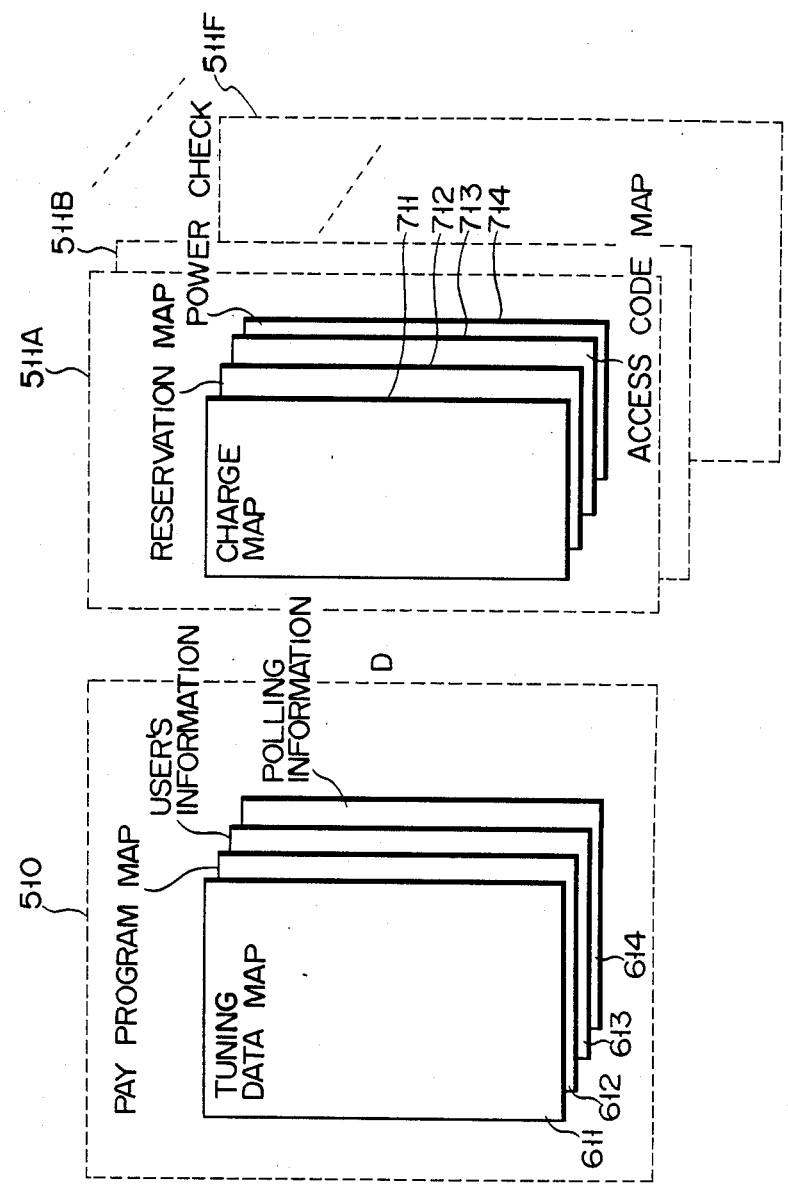
FIG. 10 is a view showing a memory map in the external control unit.

FIG. 10 shows a memory map of the RAM 106 in the external control unit 12. The memory map can be roughly classified into a common map 510 and subscriber's maps 511A to 511F.

The common map 510 has a tuning data map 611, a pay program map 612, a user's information map 613 and a polling information map 614. Each of the subscriber's maps 511A to 511F has a charge map 711, a reservation map 712, a access code map 713 and a power check map 714.

The tuning data map 611 in the common map 510 is utilized as follows. When a subscriber selects a channel, the subscriber operates a numeral key corresponding to a desired channel. A channel request signal is supplied from the corresponding SPU 13 to the ECU 12 and is decoded by the CPU 103. The CPU 103 reads out the tuning data corresponding to the channel request signal from the tuning data map 611 and supplies the readout data to the latch circuit 73.

In this manner, the tuning data map 611 is utilized for decoding when the channel request signal from the subscriber is converted into the tuning data.

The pay program map 612 is utilized as follows. In the CATV system, when the pay program is broadcast, the tuning data for receiving the pay program is transmitted in advance as forward data. The tuning data for receiving the pay program is stored in the pay program map 612. When the pay program is broadcast, subscribers who have reserved the pay program are searched by the CPU 103. The reservation data of the subscribers are stored in the reservation map 712. When the CPU 103 detects a subscriber who has reserved the pay program, it supplies the tuning data of the pay program to the latch circuit 73 of the corresponding subscriber. Thus, the converter tuner can receive the broadcast signal of the pay program.

When the channel request signal corresponding to the channel of the pay program is sent from another subscriber who has not reserved the pay program, the CPU 103 searches the reservation map 712 of the corresponding subscriber. When it is discriminated that the subscriber has not reserved the pay program, the CPU 103 inhibits supply of the tuning data of the pay program to the converter tuner corresponding to the subscriber.

The user's information map 613 is utilized as follows. The map 613 stores data indicating a subscriber who is short in payment or has not paid a charge. When the channel request signal is sent from such a subscriber, the CPU 103 inhibits supply of the tuning data to the converter tuner of the corresponding subscriber. In this case, the CPU 103 can supply display data indicating shortage of payment with respect to such a delinquent subscriber.

The polling information map 614 is utilized as follows. The map 614 stores data for increasing polling frequency of a subscriber who has a special contract with the CATV company. The special contract includes a security contract. When the CPU 103 communicates with a plurality of SPUS, it controls the polling and selecting circuit 51 (FIG. 2B) so that it communicates more frequently with a subscriber who has a special contract with the company or a communication time is prolonged.

The charge map 711 of the subscriber's map is utilized as follows. The charge map 711 stores the charge data when a subscriber who has reserved the pay program watches the pay program for longer than a predetermined period of time. Judgement of whether or not the subscriber watches the program is made as follows. When the pay program starts, the CPU 103 causes a counter to start counting. When the subscriber watches the pay program for 30 minutes or more, the CPU 103 writes the charge data in the charge map 711.

The reservation map 712 is utilized as follows. The map 712 stores data indicating the pay programs reserved by the subscriber. When the pay program starts, the CPU 103 checks whether or not the subscriber has reserved this pay program. In this case, the CPU 103 makes a comparison between a content of the channel data in the map 712 and that in the pay program, so as to determine the presence/absence of the reservation. When the subscriber has reserved the pay program, the tuning data of the pay program is supplied to the converter tuner, as described above.

The access code map 713 is utilized as follows. When a subscriber sends a channel request signal from a keyboard, he can use his own access code. Therefore, the pay program received by a system using the access code cannot be received by simply operating keys corresponding to a channel number.

When the pay program starts, the CPU 103 checks if the subscriber sets the access code with respect to this pay program. When a subscriber who sets the access code with respect to the pay program is present, the CPU 103 is in the stand-by state until the corresponding SPU transmits the access code. When the subscriber transmits the access code, the CPU 103 reads out the tuning data of the pay program from the pay program map 612, and supplies the readout data to the converter tuner of the corresponding subscriber.

As described above, when the CPU 103 is waiting for the access code, it can supply to the subscriber display data signaling that the pay program has started.

Figure 11:
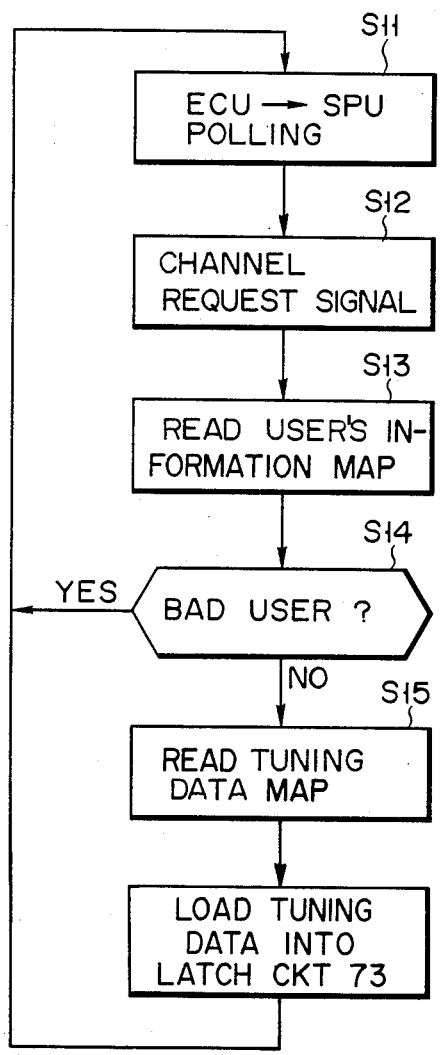
FIG. 11 is a flow chart in a channel selection mode.

FIG. 11 is a flow chart when a normal television signal is received. When the channel request signal is detected by the ECU 12 upon polling of the respective subscribers, the CPU 103 reads the user's information in the user's information map 613 (steps S11, S12, S13). If the corresponding subscriber is a delinquent user, the CPU 103 does not supply the tuning data to the converter tuner thereof, and shifts to the next processing (step S14). On the other hand, when the CPU 103 reads the user's information map 613 and detects that the corresponding subscriber has paid a charge, the flow advances to step S15, and the CPU 103 supplies the tuning data to the converter tuner.

Figure 12A:
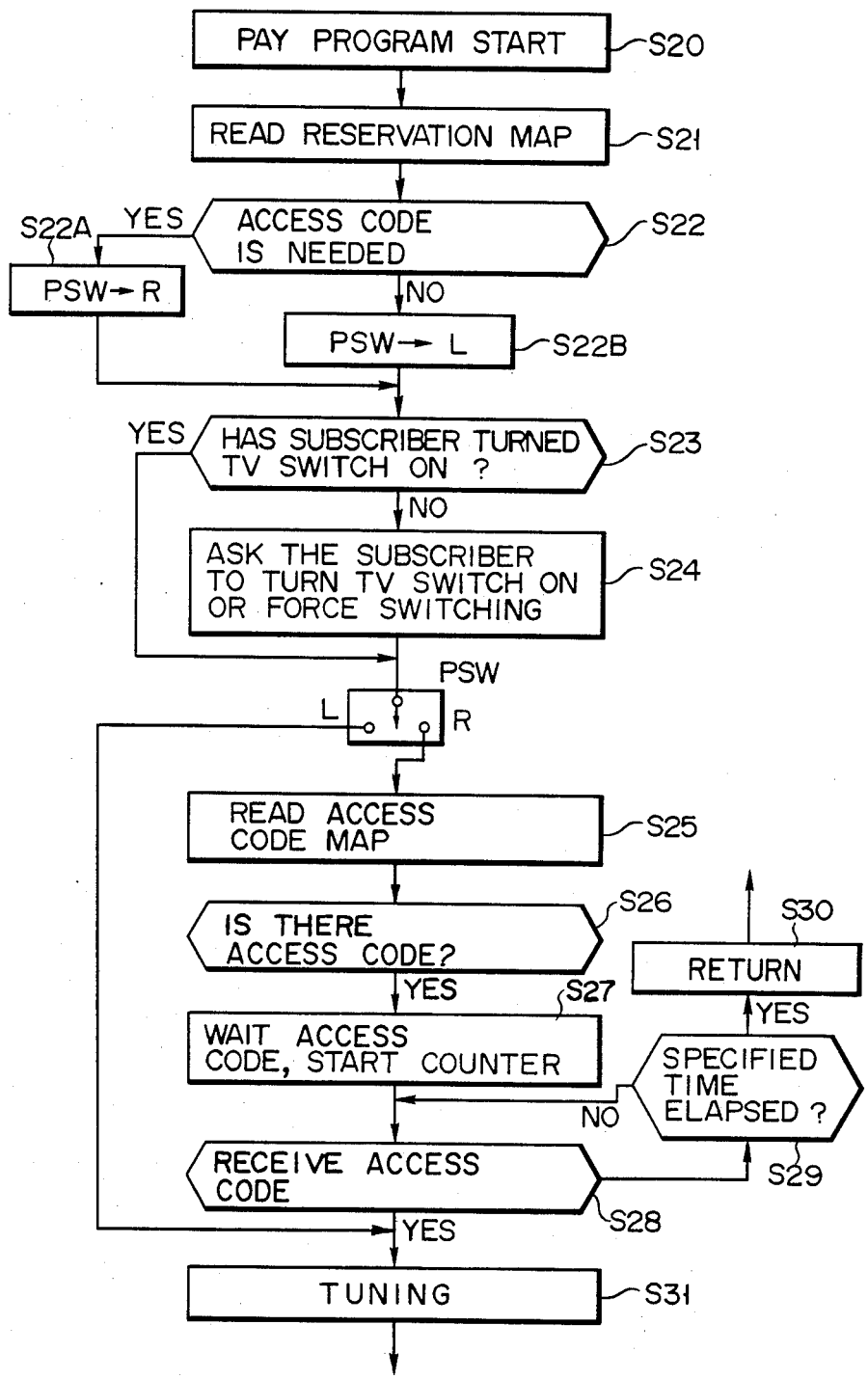
FIGS. 12A and 12B are flow charts showing an operation of a microcomputer in a pay program start mode.
Figure 12B:
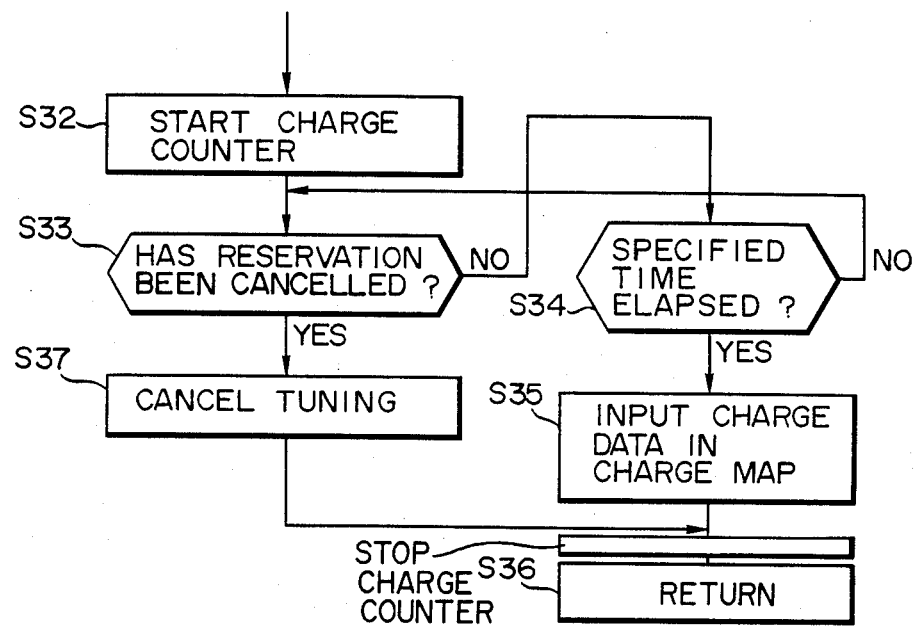

FIG. 12 shows an example of a routine processed by the CPU 103 when the pay program starts. Start data of the pay program is transmitted as forward data. The start data is decoded by the CPU 102, and is supplied to the CPU 103. If it is detected in step S20 that the pay program has started, the CPU 103 reads the reservation map 712 (step S21). When no subscriber who has reserved the pay program is detected, the CPU 103 executes the next processing (e.g. polling). When a subscriber who has reserved the pay program is detected, the CPU 103 checks if the pay program needs the access code (step S22). It is noted that the pay program which needs the access code is a program which can only be watched by a subscriber knowing an access code. Data indicating whether or not the access code is needed is also transmitted as the forward data.

If YES in step S22, the CPU 103 switches a program switch PSW to R (step S22A), and the flow advances to step S23. If NO in step S22, the CPU 103 switches the switch PSW to L (step S22B), and the flow advances to step S23.

In step S23, it is checked if the subscriber who has reserved the pay program has turned on the television receiver.

If NO in step S23, i.e., if the subscriber has not turned on the receiver, the CPU 103 supplies display data so as to turn on the receiver, or supplies to the SPU 13 an instruction for forcibly turning on the switch 157 (FIG. 2C).

If the corresponding subscriber has prepared a access code for receiving the pay program, the CPU 103 is in the stand-by state until the access code is supplied therefrom (steps S25, S26, S27). A waiting time for the access code is counted by a counter. If the waiting time for the access code exceeds a predetermined period of time, the CPU 103 does not supply the tuning data, and executes the next processing (steps S28, S29, S30).

If the access code is sent from the corresponding subscriber while the CPU 103 is waiting for the access code, the CPU 103 supplies the tuning data to the converter tuner thereof (step S31). After generating the tuning data, the CPU 103 starts a charge counter (step S32). If the subscriber cancels the reservation during measurement of the time by the charge counter, the CPU 103 clears the tuning data and executes the next processing (steps S33, S37, S36). If, e.g., 30 minutes or 20 minutes has elapsed in the charge counter, the CPU 103 writes the charge data in the charge map 711 of the corresponding subscriber, and executes the next processing (S34, S35, S36).

FIG. 13 shows the pay program map, the reservation map and the charge map in more detail.

Before the pay program starts, the station 11 transmits tuning data CHD and flag data FLD. Therefore, the pay program is not broadcast on a specific channel but is broadcast by arbitrarily utilizing a channel which is not in use during a time band of the pay program. This can be arranged to prevent a user knowing in advance on which channel the pay program is broadcast. If a user knows in advance the channel on which the pay program is broadcast, he can remodel the converter tuner and can tap the pay program without paying a charge. However, with this method, since the user cannot know in advance the channel on which the pay program is broadcast, tapping can be effectively prevented.

The pay program map 612 stores pairs of tuning data CHD and flag data FLD indicating if the program is charged for respective channels PN1 to PN128. On the other hand, the reservation map has storage areas corresponding to the channels PN1 to PN128. Referring to FIG. 13, each subscriber has a charge data area of one bit. However, this bit number can be increased.

In the example illustrated in FIG. 13, subscribers SUB1 and SUB2 reserve the channel PN2, and a subscriber SUB3 reserves the channel PN1. Assuming that the pay program starts on the channel PN2, the charge data "1" is written in the charge map 711 of the subscriber SUB1 watching this pay program for 30 minutes or more. When the pay program starts on the channel PN2, if the subscriber SUB2 cancels the pay program within 30 minutes, no charge data is written in the charge map of the subscriber SUB2.

Figure 14:
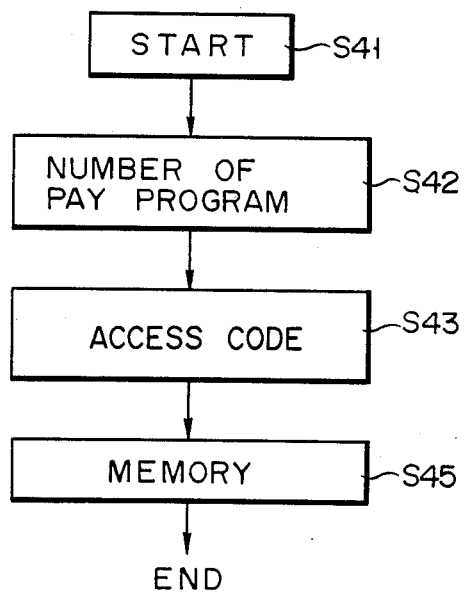
FIG. 14 is a flow chart of a program used when a access code is provided.

FIG. 14 is a flow chart of a program used when the access code is set by operating the keyboard 155. When a access code setting key of the keyboard 155 is operated, the program starts, and the access code map 713 is initialized (step S41). The number of the pay program for which the access code is set is requested to the subscriber (step S42). When the subscriber inputs the number of the pay program by key operation, the access code is requested (step S43). When the subscriber inputs the access code by the key operation, the CPU 103 writes the access code in the access code map (step S45).

What is claimed is:

1. A communication data processing device of a cable television system comprising:

cable means for transmitting a communication signal consisting of forward data in a downstream direction from a central station and reverse data in an upstream direction to a central station, and a broadcast signal;

an external control unit including a converter tuner, connected to said cable means, for performing channel selection of the broadcast signal by frequency conversion of the broadcast signal to a reception channel signal compatible with a television receiver;

a drop cable for transmitting the reception channel signal from said converter tuner to a subscriber processing unit, and for transferring data between the external control unit and the subscriber processing unit;

a memory in the external control unit having a pay program map for storing tuning data for receiving a pay program of the broadcast signal, and a reservation map for indicating reservation of the pay program by the subscriber processing unit;

the subscriber processing unit including means for transmitting reservation data to the external control unit so that the subscriber processing unit can reserve the pay program;

means in the external control unit for storing reservation data in the reservation map in response to receipt from the subscriber processing unit of the reservation data of the pay program;

mans for detecting in response to the communication signal from said cable means that the pay program has started;

means in the external control unit for searching the reservation map so as to detect whether a subscriber processing unit has reserved the pay program upon detecting that the pay program has started; and means in the external control unit for supplying the tuning data included in the pay program map to the converter tuner corresponding to the subscriber processing unit detected to have reserved the pay program.

2. A device according to claim 1, wherein the memory further includes a user's information map indicating charge data for the subscriber processing unit, and further comprising:

a charge counter in the external control unit that is started after the tuning data is supplied for determined an elapsed time; and means in the external control unit for storing charge data in the user's information map in response to the supplying of tuning data for a predetermined elapsed time.

3. A device according to claim 2, further comprising:

means for reading out data in said user's information map in response to a channel request signal from the subscriber processing unit; and means for inhibiting supply of the tuning data to the converter tuner corresponding to the subscriber processing unit when a content of the data in the user's information map indicates that the subscriber processing unit is operated by a user who has not paid a charge.

4. A device according to claim 1, wherein said memory further includes an access code map for storing an access code of a channel request signal of the subscriber processing unit, with a unique access code provided for each subscriber processing unit.

5. A device according to claim 4, further comprising:

means for detecting whether or not the pay program needs the access code when the pay program starts and the subscriber processing unit reserving the pay program is detected; and means for waiting until the access code is sent from the subscriber processing unit when the pay program needs the access code, said means for supplying the tuning data for receiving the pay program to the converter tuner corresponding to the subscriber processing unit does not supply the tuning data unless the access code is sent from the subscriber processing unit.

6. A device according to claim 1, wherein the memory further has a command map for storing a command set from a central station as the forward data.

7. A device according to claim 6, further including:

a display provided at the subscriber processing unit; and means for directly supplying the command in the command map to a control unit of the display.

8. A communication data processing device of a cable television system comprising:

cable means for transmitting a communication signal consisting of forward data in a downstream direction from a central station and reverse data in an upstream direction to a central station, and a broadcast signal;

an external control unit including a converter tuner connected to said cable means, for performing channel selection of the broadcast signal by frequency conversion of the broadcast signal to a reception channel signal compatible with a television receiver;

a drop cable for transmitting the reception channel signal from said converter tuner to a subscriber processing unit, and for transferring data between the external control unit and the subscriber processing unit;

a memory in the external control unit having a pay program map for storing tuning data for receiving a pay program of the broadcast signal, and a reservation map for indicating reservation of the pay program by the subscriber processing unit;

the subscriber processing unit including means for transmitting reservation data to the external control unit so that the subscriber processing unit can reserve the pay program;

means in the external control unit for storing reservation data in the reservation map in response to receipt from the subscriber processing unit of the reservation data of the pay program;

means for detecting in response to the communication signal from said cable means that the pay program has started;

means in the external control unit for searching the reservation map so as to detect whether a subscriber processing unit has reserved the pay program upon detecting that the pay program has started;

means in the external control unit for supplying the tuning data included in the pay program map to the converter tuner corresponding to the subscriber processing unit detected to have reserved the pay program; and means for forcibly turning on a television receiver of the subscriber processing unit when the pay program starts and the subscriber processing unit is detected to have reserved the pay program.

9. A bi-directional CATV system, comprising:

a head end for transmitting a broadcasting signal for bi-directional upstream/downstream communications control and for down-loading a command to subscriber processing units (SPUs);

external control units (ECUs), connected to said head end via a plurality of feeder cables, each of said ECUs includes:

a broadcasting signal distribution control means for controlling distribution of said broadcasting signal to a plurality of associated subscriber processing units (SPUs) via a plurality of drop cables associated with said SPUs;

a first bi-directional communications control means for providing a bi-direction communication between said head end and said ECU; and a second bi-directional communications control means for providing a bi-directional communication between said ECU and said associated SPUs via said drop cables;

said SPUs being coupled to respective ECUs for supplying power to the respective ECUs via the respective drop cables to activate the respective ECUs, and for transmitting upstream data to the respective ECUs, wherein each of said SPUs includes:

a power circuit;

a broadcasting signal receiver;

a power check data transmitting means for transmitting power-check data, indicating whether said SPU is supplying power via an associated drop cable coupled to said associated ECU, in order for said associated ECU to recognize whether said SPU is supplying power to said assocaiated ECU;

pay-program reservation data transmitting means for transmitting pay-program reservation data to said associated ECU to reserve reception of a pay program; and receiver power supply switch means, coupled to said broadcasting signal receiver, for performing a switching operating in accordance with a command downloaded by said associated ECU via said associated drop cable;

and wherein each of said ECUs further includes:

drop cable terminals coupled to associated SPUs via associated drop cables;

subscriber boards, respectively coupled to said drop cable terminals, for distributing said broadcasting signals, including a pay-program signal, to said associated SPUs using converter tuners;

pay-program reception control data latch means, provided in correspondence with said subscriber boards, for causing said subscriber boards to latch control data necessary to enable said braodcasting signal receivers of said associated SPUs to receive said pay program;

memory means for storing data a used in a bi-directional communication between said first bi-directional communications control means and said head end, and data, including reservation and power check data, used in a bi-directional communication between said associated SPUs and said second bi-directional communications control means;

an arithmetic and logic operation unit for controlling said first and second bi-directional communications control means and for performing an arithmetic and logic operation according to a predetermined program; and forcible reception control means for detecting when transmission of a pay program from said head end is started, and for referring to said reservation data and said power check data stored in said memory means, so as to down-load a command to said associated SPUs in which said receiver power supply switch means are opened to forcibly close said receiver power supply switch means which are opened, and for supplying, to said pay-program reception control data latch means the latch data necessary to distribute said pay-program signal to said subscriber boards in accordance with said reservation data, said receiver power supply switch means of said associated SPUs which have an authorization to receive said pay program at the time said pay-program starts being forcibly closed to receive said pay program.

10. A bi-directional CATV system comprising:

a head end for transmitting a broadcasting signal for bi-directional upstream/downstream communications control and for down-loading a command to subscriber processing units (SPUs);

external control units (ECUs), connected to said head end via a plurality of feeder cables, each of said ECUs includes:

a broadcasting signal distribution control means for controlling distribution of said broadcasting signal to a plurality of associated subsriber processing units (SPUs) via a plurality of drop cables associated with said SPUs;

a first bi-directional communications control means for providing a bi-directional communication between said head end and said ECU;

and a second bi-directional communications control means for providing a bi-directional communication between said ECU and said associated SPUs via said drop cables;

said SPUs being coupled to respective ECUs for supplying power to the respective ECUs via the respective drop cables to activate the respective ECUs, and for transmitting upstream data to the respective ECUs, wherein each of said SPUs includes:

a power circuit;

a broadcasting signal receiver having receiver power supply switch means; and an SPU arithmetic and logic operation unit for controlling bi-directional communication with the associated ECU, for executing a command down-loaded from said associated ECU, and for controlling transmission of upstream data, including power supply switch data, which is indicative of the state of said receiver power supply switch means of said broadcasting signal receiver, and subscriber operation data, which is produced by operation of subscriber operation means by subscribers;

and wherein each of said ECUs further includes: drop cable terminals coupled to associated SPUs via associated drop cables; subscriber boards controlled by said broadcasting signal distribution control means for distributing said broadcasting signals including a pay-program signal, to said associated SPUs using converter tuners;

first memory means for storing pay-program reservation data and said power supply switch data in a predetermined memory region, said pay-program reservation data being transmitted from said associated SPUs via said associated drop cables when said subscriber operation means are operated by said subscribers, said broadcasting signal distribution control means controlling said subscriber boards to distribute said pay program in accordance with said reservation data;

second memory means for storing data used in bi-directional communication between said first bi-directional communications control means and said head end, and data used in a bi-directional communication between said associated SPUs and said second bi-directional communications control means;

an ECU arithmetic and logic operation unit for controlling said first and second bi-directional communications control means and for performing an arithmetic and logic operation according to a predetermined program;

subscriber assessment counter means, driven by a program loaded in said ECU arithmetic and logic operation unit, for referring to said pay-program reservation data for said associated SPUs stored in said first memory means and counting the amount of assessment in accordance with distribution of the pay-program to associated subscriber boards; and subscriber assessment counter control means for referring to said pay-program reservation data and said power supply switch data for said associated SPUs and stopping operation of said subscriber assessment counter means with respect to said associated SPUs in which said receiver power supply switch means are detected to be opened, thereby preventintg said subscriber assessment counter means from performing a counting operation for said associated SPUs which are not receiving said pay program.

11. A bi-directional CATV system comprising:

a head end for transmitting a broadcasting signal for bi-directional upstream/downstream communications control and for down-loading a command to subscriber processing units (SPUs);

external control units (ECUs), connected to said head end via a plurality of feeder cables, each of said ECUs includes:

a broadcasting signal distribution control means for controlling distribution of said broadcasting signal to a plurality of associated subscriber processing units (SPUs) via a plurality of drop cables associated with said SPUs;

a first bi-directional communications control means for providing a bi-directional communication between said head end and said ECU; and a second bi-directional communications control means for providing a bi-directional communication between said ECU and said associated SPUs via said drop cables;

said SPUs being coupled to respective ECUs for supplying power to the respective ECUs via the respective drop cables to activate the respective ECUs, and for transmitting upstream data to the respective ECUs, wherein each of said SPUs includes:

a power circuit;

a broadcasting signal receiver having receiver power supply switch means; and an SPU arithmetic and logic operation unit for controlling bi-directonal communication with the associated ECU, for executing a command down-loaded from said associated ECU, and for controlling transmission of upstream data, including power supply switch data, which is indicative of the state of said receiver power supply switch means of said broadcasting signal receiver, and subscriber operation data, which is produced by operation of subscriber operation means by subscribers;

and wherein each of said ECUs further includes:

drop cable terminals coupled to associated SPUs via associated drop cables;

subscriber boards controlled by said broadcasting signal distribution control means for distributing said broadcasting signals, including a pay-program signal, to said associated SPUs using converter tuners;

first memory means for storing pay-program reservation data and said power supply switch data in a predetermined memory region, said pay-program reservation data being transmitted from said associated SPUs via said associated drop cables when said subscriber operation means are operated by said subscribers, said broadcasting signal distribution control means controlling said broadcasting signal distribution control means controlling said subscriber boards to distribute said pay program in accordance with said reservation data;

second memory means for storing data used in a bi-directional communication between said first bi-directional communications control means and said head end, and data used in a bi-directional communication between said associated SPUs and said second bi-directional communications control means;

an ECU arithmetic and logic operation unit for controlling said first and second bi-directional communications control means and for performing an arithmetic and logic operation according to a predetermined program; and forcible reception control means, driven by a program loaded in said ECU arithmetic and logic operation unit, for referring to said reervation data and said power supply switch data stored in said first memory means, detecting said associated SPUs in which said power supply switch means are open and which are authorized to receive said pay program and down-loading a command to said detected SPUs to forcibly close said receiver power supply switch means of said detected SPUs when broadcasting of said pay program starts, thereby making said broadcasting signal receivers of said detected SPUs operative.

12. The bi-directional CATV system according to claim 11, in which said broadcasting signal receivers which have been forced to be operative by said forcible reception control means, are made inoperative by causing said forcible reception control means to open said power supply switch means of said associated SPUs when broadcasting of said pay program is completed.

13. The bi-directional CATV system according to claim 11, wherein said subscriber operation means, when operated by said subscribers, produce pay-program reservation data and predetermined first access data for said subscriber to determine whether to receive a reserved pay program;

wherein said pay program reservation data and said first access data are transmitted to said associated ECU via the associated drop cable by said SPU arithmetic and logic operation unit; and wherein said ECU arithmetic and logic operation unit refers to said pay-program data when broadcasting of said pay-program is started, determines whether second access data is matched by said first access data transmitted via said associated drop cable, and inhibits said pay program from being supplied to associated subscriber boards when said first access data does not match with said second access data.

14. The bi-directional CATV system according to claim 13, wherein even when said second access data matches with said first access data, said ECU artihmetic and logic operation unit inhibits reception of said pay program when said second access data is not transmitted to said associated ECU within a predetermined period of time.

* * * * *